United States Patent [19]

Fujimori et al.

[11] Patent Number: 5,825,752
[45] Date of Patent: Oct. 20, 1998

[54] LOCAL AREA NETWORK TRANSFERRING DATA USING ISOCHRONOUS AND ASYNCHRONOUS CHANNELS

[75] Inventors: Junichi Fujimori; Tatsutoshi Abe, both of Hamamatsu, Japan

[73] Assignee: Yamaha Corporation, Hamamatsu, Japan

[21] Appl. No.: 719,511

[22] Filed: Sep. 25, 1996

[30] Foreign Application Priority Data

Sep. 26, 1995 [JP] Japan ..................... 7-270738

[51] Int. Cl.$^6$ ............... H04Q 11/04; H04M 3/42
[52] U.S. Cl. ............ 370/260; 370/409; 370/432; 370/462; 348/15; 379/201
[58] Field of Search ............... 370/259, 260, 370/264, 400, 409, 410, 431, 432, 433, 437, 462, 465, 468, 477; 84/601, 645; 348/12, 13, 14, 15, 16, 17; 379/200, 201

[56] References Cited

U.S. PATENT DOCUMENTS

| | | | |
|---|---|---|---|
| 4,320,683 | 3/1982 | Whitefield | 84/115 |
| 4,412,470 | 11/1983 | Jones | 84/645 |
| 4,644,840 | 2/1987 | Franz et al. | 84/645 |
| 5,119,710 | 6/1992 | Tsurumi et al. | 84/615 |
| 5,251,212 | 10/1993 | Gass | 370/462 |
| 5,331,111 | 7/1994 | O'Connell | 84/602 |
| 5,376,750 | 12/1994 | Takeda et al. | 84/602 |
| 5,389,729 | 2/1995 | Hiramatsu | 84/601 |
| 5,440,556 | 8/1995 | Edem et al. | 370/465 |
| 5,544,324 | 8/1996 | Edem et al. | 370/538 |
| 5,550,802 | 8/1996 | Worsley et al. | 370/410 |

FOREIGN PATENT DOCUMENTS

| | | |
|---|---|---|
| 7-287572 | 10/1995 | Japan . |
| 241429 | 2/1995 | Taiwan . |
| 251402 | 7/1995 | Taiwan . |

*Primary Examiner*—Alpus H. Hsu
*Attorney, Agent, or Firm*—Graham & James LLP

[57] ABSTRACT

In a network system, a plurality of nodes are communicable with one another to exchange information and to transfer data, and a bus is provided for connection to the nodes and for configuration of logical paths to logically link one node to another node so as to secure transfer of the data. Each node has at least one port which is allocated for accessing the bus and which is classified into four types of an isochronous talker, an isochronous listener, a multicast talker and a multicast listener. The nodes are allocated to bind isochronous channel numbers or multicast channel numbers to respective isochronous or multicast talkers and listeners in a manner so as to maximize efficiency of the network.

16 Claims, 27 Drawing Sheets

FIGURE 4

PATH INFORMATION TABLE (PIM)

| LISTENER PORT ID | TALKER PORT ID | TALKER NODE UNIQUE ID | CONNECTION FLAG |
|---|---|---|---|
| ID_NO. | ID_NO. | UNIQUE ID NO. | CONNECTED/DISCONNECTED |

FIGURE 5

NODE INFORMATION TABLE (NIM)

| NODE ID | NODE UNIQUE ID |
|---|---|
| ID_NO. | UNIQUE ID NO. |

FIGURE 6

MC INFORMATION TABLE (MC MANAGER)

| PORT ID | PORT TYPE | MC RESOURCE |
|---|---|---|
| ID_NO. | MC TALKER | CHANNEL NUMBER |
| ID_NO. | MC LISTENER | CHANNEL NUMBER |

FIGURE 7

ISO INFORMATION TABLE (ISO MANAGER)

| PORT ID | PORT TYPE | ISO RESOURCES |
|---|---|---|
| ID_NO. | ISO TALKER | CHANNEL NUMBER / BANDWIDTH |
| ID_NO. | ISO LISTENER | CHANNEL NUMBER |

FIGURE 8

PORT INFORMATION ENTRY (NIM)

| PORT ID | PORT TYPE | RESOURCES |
|---|---|---|
| ID_NO. | ISO TALKER | CHANNEL NUMBER/ BANDWIDTH |
| ID_NO. | ISO LISTENER | CHANNEL NUMBER |
| ID_NO. | MC LISTENER | CHANNEL NUMBER |

FIGURE 9

TALKER INFORMATION REPORTING PACKET

| PACKET ID | TALKER PORT ID | TALKER NODE ID | TALKER NODE UNIQUE ID | TALKER RESOURCE INFORMATION |
|---|---|---|---|---|

LOCAL AREA NETWORK TRANSFERRING DATA USING ISOCHRONOUS AND ASYNCHRONOUS CHANNELS

BACKGROUND OF THE INVENTION

The present invention relates to a network system in which a multiple of nodes are interconnected to each other by logical paths established in a bus, and relates to a data transfer method which can preferably be employed in a network system for transmission of MIDI (Musical Instrument Digital Interface) data and audio data.

In a recent AV (Audio Visual) system, a multiple of devices can be connected to each other to form a network. The connection media such as coaxial cables, shield cables and parallel pair cables are used for connecting electronic devices to each other. The situation is the same as in connecting MIDI devices. In order to establish a network in MIDI systems, electronic musical instruments are interconnected to each other by the coaxial cables, shield cables and so on. As described above, in the current MIDI systems (or electronic music environments employing MIDI), inter-device paths are composed of a network topology structured by the physical connection media, so that it is troublesome to restore the same network configuration in another place.

Further in such a network, the connection cables tend to be so many lines that the cables occupy a large space, and re-cabling work thereof is painstaking once the cables are disconnected. Thus, there is proposed a network architecture in which multiple devices are connected to each other through a single cable, by which data are exchanged among the devices. The protocol layer structure in such a network architecture is shown in FIG. 35. The protocol layer structure is comprised of a physical layer 102, a link layer 103, a transaction layer 104, and a serial bus manager 101. The physical layer 102 defines a physical interface interconnecting nodes, carries out conversion between an electric signal and logical symbols which can be handled by the link layer 103. The electric signal is transferred through various serial bus media. In the architecture, the single physical layer 102 can transfer data by certain bus arbitration. In other words, the multiple nodes never transmit data simultaneously. The link layer 103 takes charge of addressing node to node, data check and data framing, to thereby provide one-way data transmission service for the transaction layer 104. The data transmission is acknowledged by an ACK signal from a data recipient node. The link layer 103 also provides an isochronous transmission described later. The transaction layer 104 provides inter-node transaction service (request-response protocol) recommended, for example, by IEEE 1212 CSR (Control and Status Register). However the transaction layer 104 does not provide any service for isochronous data. The serial bus manager 101 is an entity administrating the CSR which represents facilities of each node. The serial bus manager 101 carries out centralized administration of isochronous channels and frequency bands of the data within the local bus.

In the isochronous transmission, a bus cycle of 125 μsec is normally used so that a node having an isochronous channel can transmit one data packet within one cycle through a band allocated for the node. Further in the isochronous transmission, a packet is not addressed to a unique node, but a packet labeled by an isochronous channel number is broadcasted to all the nodes. In each node supporting the isochronous transmission, each reception of the isochronous packet is all notified to the link layer 103. The link layer 103 determines whether the transferred data packet should be accepted or not according to the channel number associated with the packet. Such a network architecture is proposed, for example, in IEEE P1394 "High Performance Serial Bus Standard". In the network architecture, the plural nodes are just required to connect with a single cable in the physical level. In the isochronous transmission, a transmitter node obtains a channel number and a band as resources for data transmission in advance, while a receiver node specifies a channel number to receive data from a corresponding transmitter node. Thus, the isochronous packet broadcasted from a transmission port of the transmitter node can be received by a unique receiving port of the receiver node. As described above, the link layer 103 determines whether each transmitted isochronous packet should be accepted or not. The accepted packet is handed to an upper layer of the protocol layer structure. In such a network architecture where a certain transmission band must be secured in the isochronous transmission, transfer of discrete data such as a MIDI message may not be effective because the obtained band is not fully utilized, so that it is difficult to maximize the network usage efficiency.

SUMMARY OF THE INVENTION

A purpose of the present invention is to provide a network architecture and a data transmission method by which the maximum network usage efficiency can be realized even in case that discrete data is transmitted.

Another purpose of the present invention is to provide a network architecture in which resetting or reconfiguration of the network can be automatically executed even in case that a node is newly installed or removed while the network is in operation.

According to the invention, a network system comprises a plurality of nodes communicable with one another to exchange information and to transfer data, and a bus provided for connection to the nodes and for configuration of logical paths to logically link one node to another node so as to secure transfer of the data. Each node has at least one port which is allocated for accessing the bus and which is classified into four types of an isochronous talker, an isochronous listener, a multicast talker and a multicast listener. Each node binds an isochronous channel number and a communication band to the isochronous talker when the same is allocated for isochronously transmitting the data labeled by the bound isochronous channel number to the bus through the bound communication band. Each node binds an isochronous channel number to the isochronous listener when the same is allocated so that the isochronous listener can exclusively receive data transmitted from another isochronous talker allocated to another node if the transmitted data is labeled by the same isochronous channel number as that bound to the isochronous listener. Each node binds a multicast channel number to the multicast talker when the same is allocated for asynchronously broadcasting data labeled by the bound multicast channel number to the bus. Otherwise, each node binds a multicast channel number to the multicast listener when the same is allocated so that the multicast listener can exclusively receive data transmitted from another multicast talker allocated to another node if the transmitted data is labeled by the same multicast channel number as that bound to the multicast listener.

In a specific form, a transmitter node having either of the isochronous talker and the multicast talker operates when the logical paths are reset for broadcasting talker information representative of resources including an isochronous channel number, a communication band and a multicast channel number, which may be newly bound, respectively, to the isochronous talker and the multicast talker upon resetting of the logical paths, while a receiver node having either of the isochronous listener and the multicast listener operates when the broadcasted talker information is received for newly binding resources including an isochronous channel number and a multicast channel number to the isochronous listener and the multicast listener to thereby restore the logical paths. Further, the receiver node saves path information representative of the logical paths and newly binds the resources according to the broadcasted talker information and the saved path information to ensure correspondence between the resources of the receiver node and the resources of the transmitter node in terms of the isochronous channel number and the multicast channel number.

In another specific form, each node has a communication architecture composed of protocol layers including a transport layer which contains an isochronous manager for acquiring isochronous resources and binding the acquired isochronous resources to either of the allocated isochronous talker and the isochronous listener, a multicast manager for acquiring multicast resources and binding the acquired multicast resources to either of the allocated multicast talker and the multicast listener, and a path information manager cooperating with the isochronous manager and the multicast manager for providing an upper protocol layer with a service to set the logical paths and to manage the set logical paths.

In a further specific form, a transmitter node is allocated with both of the isochronous talker and the multicast talker such that the transmitter node repeatedly carries out a transfer cycle containing isochronous transmission of data by the isochronous talker and asynchronous broadcasting of data by the multicast talker, and such that the transmitter node distributes the data each transfer cycle to either of the isochronous talker and the multicast talker according to property of the data and availability of the isochronous talker and the multicast talker. For example, the transmitter node treats mixture of continuous music data and discrete music data, and distributes the continuous music data to the isochronous talker while distributing the discrete music data to the multicast talker.

As set forth in the foregoing, according to the present invention, virtual logical paths can be configured within the network system independently from the physical connection topology. If two nodes or devices are connected to the network system, a logical path can be set between the two devices independently from the physical location of the devices, and data can be exchanged through the logical path. Thus, the data can be exchanged via the virtual logical path which does not depend on the network topology, so that the connecting sequence of the devices is never mistaken, and the data can be transferred reliably. The logical connection can be modified easily without changing the physical connection of the devices, since the virtual path is configured logically among the devices. The virtual path information representative of the logical path configuration is stored in each device connected to the network. Therefore, all the path information of the whole network system can be saved in a memory media, and the same network system configuration can be restored easily and instantly with loading the saved path information from the memory media. Further, the present invention makes it possible to use not only the isochronous transmission in which the band of the transmission is assured, but also the multicast transmission with which data can be transmitted on demand to specified ones of the multiple nodes. Thus, the data can be transferred efficiently no matter how the discrete data is generated. Further, the music data such as the MIDI data and the audio data, which requires real time transmission, can be transmitted efficiently.

BRIEF DESCRIPTION OF THE DRAWINGS

FIG. 4 is a table diagram showing a format of a path information table.

FIG. 5 is a table diagram showing a format of a node information table.

FIG. 6 is a table diagram showing a format of a multicast information table.

FIG. 7 is a table diagram showing a format of an isochronous information table.

FIG. 8 is a table diagram showing a format of a port information entry.

FIG. 9 is a table diagram showing a format of a talker information reporting packet.

DETAILED DESCRIPTION OF THE INVENTION

Figure 1:
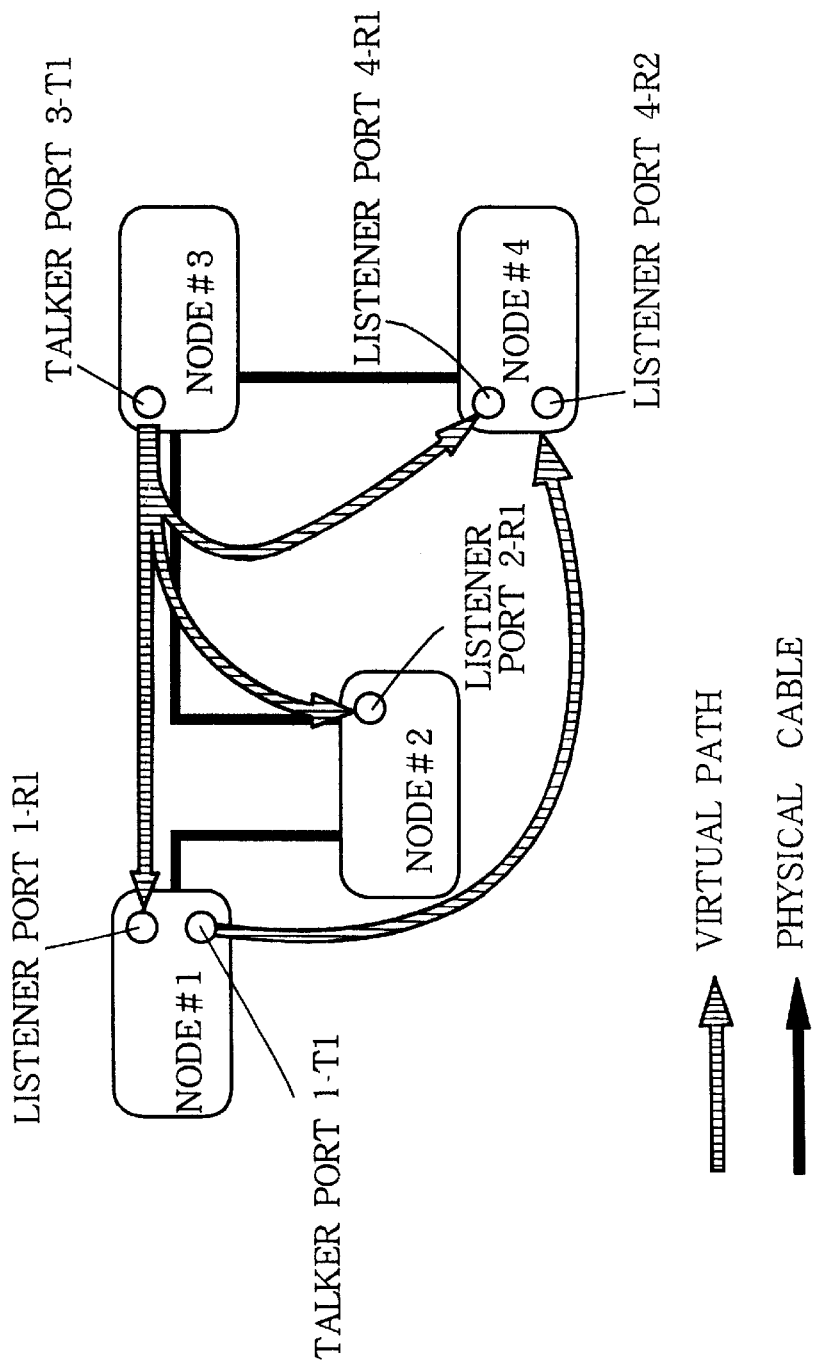
FIG. 1 is a schematic block diagram illustrating data communication in an mLAN according to the present invention.

A network system in the form of a mLAN (musical Local Area Network) according to the present invention will be explained hereunder in the order listed below:
1. Overview of mLAN
   1.1 Overview of data communication
   1.2 mLAN protocol layer structure
   1.3 mLAN transport layer
   1.4 Addressing in data transfer
   1.4.1 Path
   1.4.2 PIM (Path Information Manager)
2. mLAN transport layer specification
   2.1 Services by mLAN transport layer
   2.1.1 Port
   2.2 Structure of mLAN transport layer
   2.3 Isochronous transfer service
   2.3.1 Isochronous manager
   2.3.2 Acquiring and binding isochronous resources
   2.3.3 Binding isochronous resources
   2.3.4 Isochronous data transmission
   2.3.5 Isochronous data reception
   2.3.6 Detecting talker duplication
   2.3.7 Communicating with lower layer
   2.3.8 Communicating with PIM
   2.3.9 Bus reset handling
   2.3.10 Talker information modification
   2.3.11 Communicating with NIM
   2.4 Multicast transfer service
   2.4.1 Multicast manager
   2.4.2 Acquiring and binding multicast resources
   2.4.3 Talker information update
   2.4.4 Multicast data transmission
   2.4.5 Binding multicast resources
   2.4.6 Multicast data reception
   2.4.7 Communicating with lower layer
   2.4.8 Communicating with PIM
   2.4.9 Communicating with NIM
   2.4.10 Bus reset handling
   2.5 PIM (Path Information Manager)
   2.5.1 Path setting
   2.5.2 Data transmission to path
   2.5.3 Releasing path
   2.5.4 Bus resetting, talker information handling, and unsuccessful event notification
   2.5.5 Communicating with NIM
   2.6 NIM (Node Information Management)
   2.6.1 Port information inquiry
   2.6.2 Talker information reporting packet handling
   2.6.3 Communicating with lower layer
   2.6.4 Bus reset handling
   2.7 mLAN transport layer facility
   2.7.1 Path information table
   2.7.2 Node information table
   2.7.3 Multicast information table
   2.7.4 Isochronous information table
   2.7.5 Port information entry
   2.7.6 Talker information reporting packet
   2.8 mLAN cycle structure
   2.9 Using multicast transmission and isochronous transmission
   2.10 Plug and play
1. Overview of mLAN
   1.1 Overview of data communication FIG. 1 illustrates data communicating operation in the mLAN. As shown in FIG. 1, nodes #1 and #2, nodes #2 and #3, and nodes #3 and #4 are, respectively, mutually connected to each other through physical cables. A talker (transmission) port and a listener (recipient) port are defined as a logical entity in each node. These ports constitute a top access point which can be accessed directly from a host application in each node. In the network system of the present invention, virtual data paths (logical paths) are established between a pair of ports, so that data can be transferred through the virtual paths.

In case that the virtual paths are formed as shown in FIG. 1, the node #1 can transmit data to the node #4 through the virtual path between the talker port 1-T1 of the node #1 and the listener port 4-R2 of the node #4. The node #3 can send data to the nodes #1, #2, and #4 through the virtual paths established between the talker port 3-T1 of the node #3, and those of the listener port 1-R1 of the node #1, the listener port 2-R1 of the node #2, and the listener port 4-R1 of the node #4.

In the mLAN, the isochronous transmission is specified as one of transmission methods, by which real-time data transmission can be accomplished by acquiring a necessary band in advance to control signal delay. However, the isochronous transmission occupies the band continuously, so that the isochronous transmission does not function efficiently for transmitting discrete data such as MIDI messages. Thus, in addition to the isochronous transmission, there is introduced in the mLAN an asynchronous multicast transmission, by which data can be transmitted from one node to a multiple of other nodes. The data can be transmitted from one node to other nodes by both of the isochronous transmission and the multicast transmission. A "channel" concept is also introduced for the asynchronous packet transmission in the mLAN.

The introduced asynchronous multicast transmission is a sort of "listener initiative" in which a listener (recipient)

selectively receives a packet broadcasted by a talker (transmitter). In this method, a single band can be utilized efficiently since a common packet may be well transmitted if the same message should be sent to multiple destinations. Further in this method, the packet selection is under the control of the listener, so that work load of the talker never changes even when the number of the receiving nodes is increased. Thus, devolving a large part of the data transfer control to listeners, the work load of talkers can be decreased, and real time performance of the data transmission can be improved.

1.2 mLAN protocol layer structure

Figure 2:
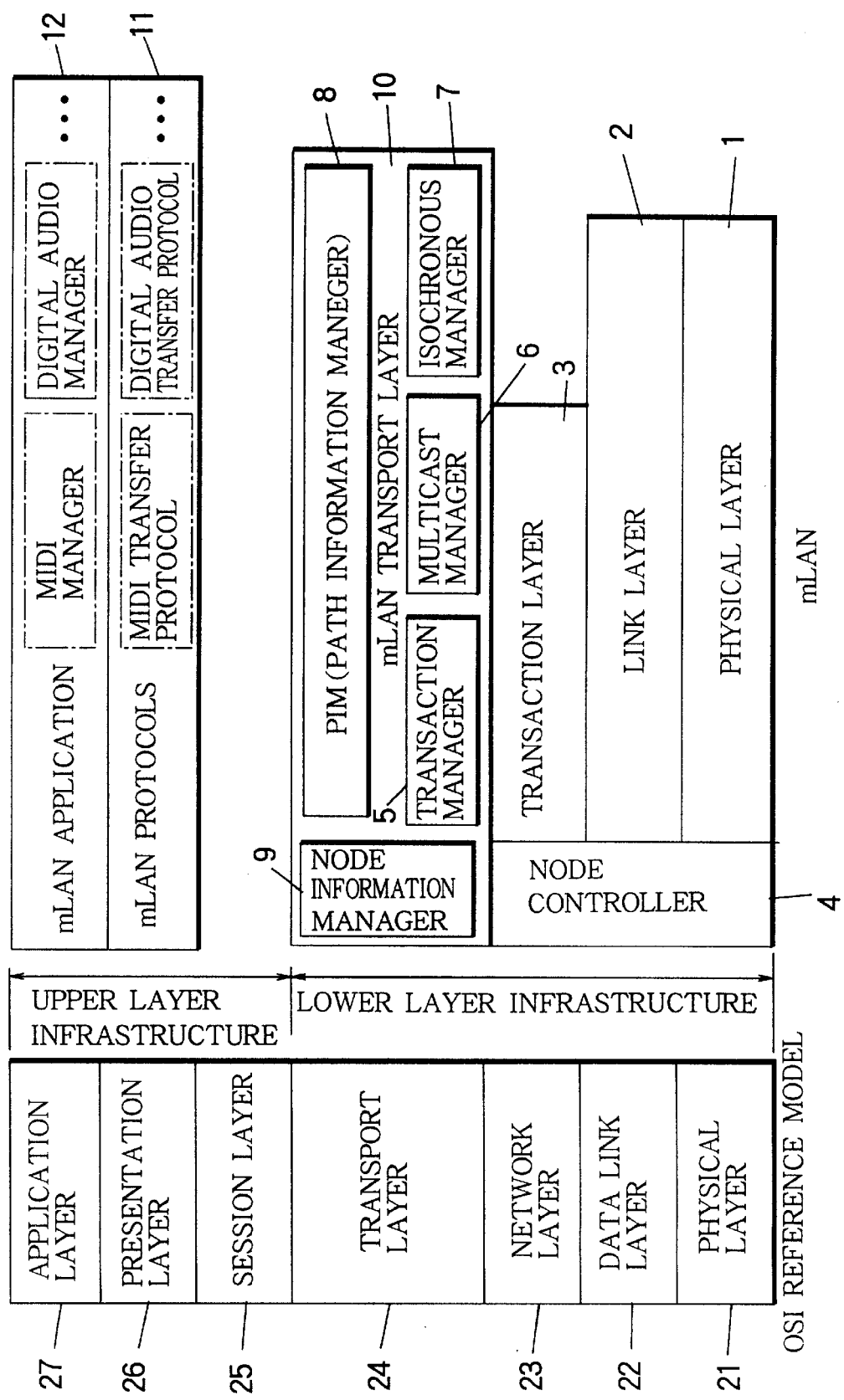
FIG. 2 is a schematic block diagram illustrating protocol layer structure in the mLAN according to the present invention.

FIG. 2 shows an example of the mLAN protocol layer structure. FIG. 2 illustrates the protocol layer structure of the inventive mLAN corresponding to OSI (Open System Interconnection) reference model. The protocol layer structure can be divided into a lower layer infrastructure and an upper layer infrastructure. The lower layer infrastructure corresponds to the first to fourth layers of the OSI reference model, while the upper layer infrastructure corresponds to the fifth to seventh layers of the OSI reference model. Means to exchange messages between applications is specified in the lower layer infrastructure, while contents of the message are specified in the upper layer infrastructure. The lower layer infrastructure establishes logical paths and provides end-to-end transmission service for the upper layers. The upper layer infrastructure defines semantics of the messages and specifies application services to utilize the messages. The upper layer is comprised of mLAN protocols 11 corresponding to the presentation layer (OSI sixth layer) 26, and an mLAN application 12 corresponding to the application layer (OSI seventh layer) 27. The functions implemented in the session layer (OSI fifth layer) 25 are carried out by the lower layers including the mLAN transport layer 10, so that the mLAN upper layer infrastructure has no layer corresponding to the session layer 25. The group of the mLAN protocols 11 specifies various supplemental control mechanisms to enable effective transmission of musical information, and provides various data formats and communication protocols. The protocols include a MIDI transfer protocol, a Digital Audio transfer protocol and so on. The mLAN application 12 utilizes a data exchange method defined by the mLAN protocols 11.

The lower layer infrastructure is comprised of an mLAN transport layer 10 corresponding to the transport layer (OSI fourth layer) 24, a transaction layer 3 corresponding to the network layer (OSI third layer) 23, a link layer 2 corresponding to the data link layer (OSI second layer) 22, a physical layer 1 corresponding to the physical layer (OSI first layer) 21, and a node controller 4.

In the mLAN transport layer 10, a sub-address called "port" is defined to achieve a port-to-port data communication, and to absorb difference of the specification in the lower layer. The mLAN transport layer 10 also provides a common service interface independent on the specification of the lower layer for the mLAN upper layer. Thus, if there are lower layers structured based on different standards, the mLAN transport layer 10 is provided for each lower layer. In the mLAN transport layer 10, there are defined a PIM (Path Information Manager) 8, an isochronous manager 7, a multicast manager 6, a transaction manager 5 and an NIM (Node Information Manager) 9.

In the physical layer 1, a physical interface interconnecting multiple nodes is specified, and the physical layer 1 carries out conversion between an electric signal and logical symbols which can be handled by the link layer 2. In the mLAN, normally a cable is used for physical connection.

The link layer 2 takes in charge of addressing node to node, data check or examination, and data framing so as to provide one-way data transfer service for the transaction layer 3. The data transmission is acknowledged by an ACK signal from the data recipient. The link layer 2 also provides an isochronous transmission described later.

The transaction layer 3 provides inter-node transaction service (request-response protocol) recommended, for example, by IEEE 1212 CSR (Control and Status Register) architecture. The node controller (which corresponds to the serial bus manager) 4 is an entity administrating the CSR which represents facilities of each node.

1.3 mLAN transport layer

In the mLAN transport layer 10, the sub-address called "port" is defined to achieve port-to-port data communication. The mLAN transport layer 10 supports not only the isochronous transmission and the asynchronous packet transaction, but also the multicast transmission which is a data transfer protocol to send data from one port to a multiple of other ports.

1.4 Addressing in data transmission

In the inter-port data transfer by the multicast transmission and the isochronous transmission, a channel should be bound to a port prior to the actual transmission. The transmitter node should obtain a channel number as a resource to transfer data in advance. while the receiver node specifies a channel number to receive data from a talker port of the transmitter node. The channel number is one of the resources allocated dynamically to transmitting and receiving ports in the data transfer. A different channel number may be allocated for the port before and after bus reset by which the paths are initialized. The receiver node specifies the corresponding transmitter node by means of a node ID. A unique node ID is automatically allocated to each node upon the bus reset. The user need not configure the node ID in contrast to SCSI (Small Computer System Interface) ID allocation. The uniqueness of the node ID in the local bus is guaranteed by the dynamic allocation by the physical layer. Thus, the node ID and the channel number used for addressing are re-allocated upon the bus reset. The node ID and the channel number may be different before and after the re-allocation. Therefore, data transfer may not be resumed due to change of the address mapping, if a bus reset occurs in the middle of the isochronous/multicast transmission. Considering such situation, route information called "path" is saved in the mLAN transport layer 10 to restore the data transfer route, so that the data transfer can be resumed even when the node ID and the channel number are changed upon the bus reset. The user does not need to attend to the bus reset.

1.4.1 Path

The path set in the port which executes the isochronous/multicast transmission is not connection-oriented, but is a kind of route information to transfer data to multiple receiving ports. In this case, the data is transferred in connection-less manner. The path information is saved in the destination node of the route and the path is restored by the mLAN transport layer 10 after the bus is initialized by bus reset or power-on reset according to the saved path information. The configured paths are administrated by the PIM (Path Information Manager) 8.

In the isochronous/multicast transmission, a packet is transferred from a talker port of one source node to listener ports of plural destination nodes. It would be difficult to transfer data in real time if the source node resolved the routing due to increase of the computing load of the source node. For example, if the source node has a list of destinations and a listed destination node is not found in the network, the source node must resolve the routing. Further, there may be simple source nodes such as a mouse and a keyboard for instance, which cannot allocate memory enough to store path information for a number of destination nodes. Thus, the path information is stored in the destination nodes according to the invention.

As described above, the path information is saved in the receiver nodes in order to reconstruct the routing after the node ID and the channel number is changed by bus reset. Thus, the path information should be a type of information which is never affected by the bus reset. The path information may include:

Talker port ID

Talker Node Unique ID

Listener port ID as illustrated in the table of FIG. 4.

The port ID is determined by applications, and Node Unique ID is hard-coded in a device of the node at the shipping of the device product. The Node Unique ID is never changed by the bus reset. Upon bus reset, the mLAN transport layer 10 updates internal path information depending on changes in the channel number and the node ID in order to provide the routing resource independent on the bus reset to the upper layer applications. Thus, applications can resume data transfer regardless of the bus reset.

1.4.2 PIM (Path Information Manager)

The PIM (Path Information Manager) 8 defined in the mLAN transport layer 10 is a module administrating each of the paths set between a pair of ports. The PIM 8 handles the allocating and releasing of the path, and maintains the path information. The PIM 8 also has a function to restore the logical paths according to the path information stored in the node, automatically upon bus initialization procedure caused by addition or removal of a node device, or upon power-on reset. The PIM 8 provides a service to set the logical paths among ports which execute isochronous or multicast transmission for the upper layer applications. The path information is stored in the PIM 8 as a path information table shown in FIG. 4. The addition or removal of a physical node device causes a bus reset. On the bus reset, node ID is dynamically allocated so that the node ID may be changed before and after the bus reset. Of course, this node ID change affects node addressing. The data could not be transferred correctly without reconfiguration. Thus, upon such a bus configuration change, the PIM 8 updates the path information table in order to assure the correct data transfer. Thus, the upper layer applications need not care for the change in the bus configuration. Preferably, the path information stored in the PIM 8 is retained while the power is turned off, and thus the correct paths can be restored after power-on reset.

2. mLAN transport layer specification 2.1 Services in mLAN transport layer

The mLAN transport layer 10 provides three kinds of transmission services for the upper layer. The three services include the multicast transmission, isochronous transmission, and transaction, which are characterized as described below.

A. Multicast transmission

The multicast transmission is an asynchronous data packet transfer in which a data packet is transferred from a talker port to multiple listener ports. The multicast transmission is specified by the mLAN transport layer 10. In the multicast transmission, packets are broadcasted to destinations, and an ACK is never returned. Thus, the transmitter node cannot recognize whether the data transfer is successful or not, but frequency bands of the bus can be utilized efficiently.

B. Isochronous Transmission

The isochronous transmission is specified in the link layer 2. Each node secures a band before the same commences the data transmission to assure a certain signal delay range, so that the total load of the whole network system is fully controlled. This transmission method is suitable for situations in which a constant volume of data is polled periodically, or in which a data arrival timing must be accurately controlled.

C. Transaction

The transaction is a bidirectional peer-to-peer transmission method specified in the transaction layer 3. The transmission is executed in connectionless manner, but ACK/retry function is implemented to assure reliable data transfer.

2.1.1 Port

The port is a service access point in the mLAN transport layer 10, and will be explained hereunder. The upper layer can access the service provided by the mLAN transport layer 10 through the port. The above-described transmission services are available only between the ports having particular property. In other words, a packet cannot be distributed to a port which is improper for the relevant service. The property of the port is defined by the resource bound thereto. The resources which can be bound as the port property can be categorized as listed below.

A. Transaction Port

A port handling transaction. The transaction port carries out both of transmitting and receiving of data. An address within the node is bound as the resource.

B. Isochronous talker

A port handling the isochronous data transmission. An isochronous channel number and an isochronous bandwidth are bound as the resources.

C. Isochronous listener

A port handling the isochronous data reception. An isochronous channel number is bound as the resources. The listener can receive a packet labeled by the same channel number as that bound to the listener.

D. Multicast talker

A port handling multicast data transmission. A multicast channel number is bound as the resources.

E. Multicast listener

A port handling multicast data receiving. A multicast channel number is bound as the resources. The listener can receive a packet labeled by the same channel number as that bound to the listener.

The transaction in the mLAN transport layer 10 can be recognized by the level of the transaction layer 3 as a transaction to the port-bound address. In this method, it is impossible to access an address location (an entry in configuration ROM, for example) which is not bound to any port. In order to access such a resource, the NIM (Node Information Manager) 9 is provided according to the invention. By issuing a request to the NIM 9 of a certain node, other nodes can derive node information (the Node Unique ID, number of ports in the node, properties of the ports) of the certain node.

2.2 Structure of mLAN transport layer

As described above, the mLAN transport layer 10 is comprised of five modules listed below.

A. Isochronous manager 7

The isochronous manager 7 acquires or obtains resources (the isochronous channel number and bandwidth) to execute isochronous transmission and binds the resources to the isochronous talker. The manager 7 also maintains the obtained isochronous resources and their binding information.

B. Multicast manager 6

The multicast manager 6 obtains a channel number to execute multicast transmission, and binds the same to the multicast talker. The manager 6 also maintains the obtained multicast resources and their binding information.

C. Transaction manager 5

The transaction manager 5 administrates resource binding to the transaction port.

D. PIM (Path Information Manager) 8

The PIM 8 configures the logical paths among the isochronous and multicast ports, and maintains the configured logical paths.

E. NIM (Node Information Manager) 9

The NIM 9 operates as a host module for the node controller 4. The NIM 9 performs configuration or reconfiguration for other modules according to the change of the bus status notified by the node controller 4.

2.3 Isochronous transmission service

The isochronous transmission service is explained hereunder. The transmitter and receiver ports handling the isochronous data transfer are respectively called "isochronous talker" and "isochronous listener". In the isochronous data communication, a bus cycle of 125 μsec is specified, for example, and a node already having an isochronous channel can transfer data by an amount of the obtained bandwidth. In case of the isochronous transmission using a newly created port as an isochronous talker, the channel number and bandwidth should be bound to the new port. In the isochronous transmission, a packet is not addressed to a unique port, but is broadcasted to all the nodes having an isochronous channel number. The node supporting the isochronous communication notifies all the isochronous packet arrivals to the link layer 2. The link layer 2 determines whether the packet should be accepted or not depending on the channel number attached to the arriving packet.

2.3.1 Isochronous manager

The isochronous manager 7 is a module provided within the mLAN transport layer 10, and manages the isochronous resources in each node. The isochronous manager 7 acquires the isochronous resources (isochronous channel number and bandwidth) upon the request from the host applications, and binds them to the isochronous talker. Upon the resource binding, the isochronous talker gets ready to transmit an isochronous packet. For the isochronous listener, an isochronous channel number is bound. An isochronous listener bound with a channel number can receive an isochronous packet associated with the same channel number. The isochronous manager maintains the resources acquired by the operation described above. When the bus is initialized by a bus reset, all the resources obtained for an isochronous port are again bound.

2.3.2 Acquiring and binding isochronous resources

Figure 10:
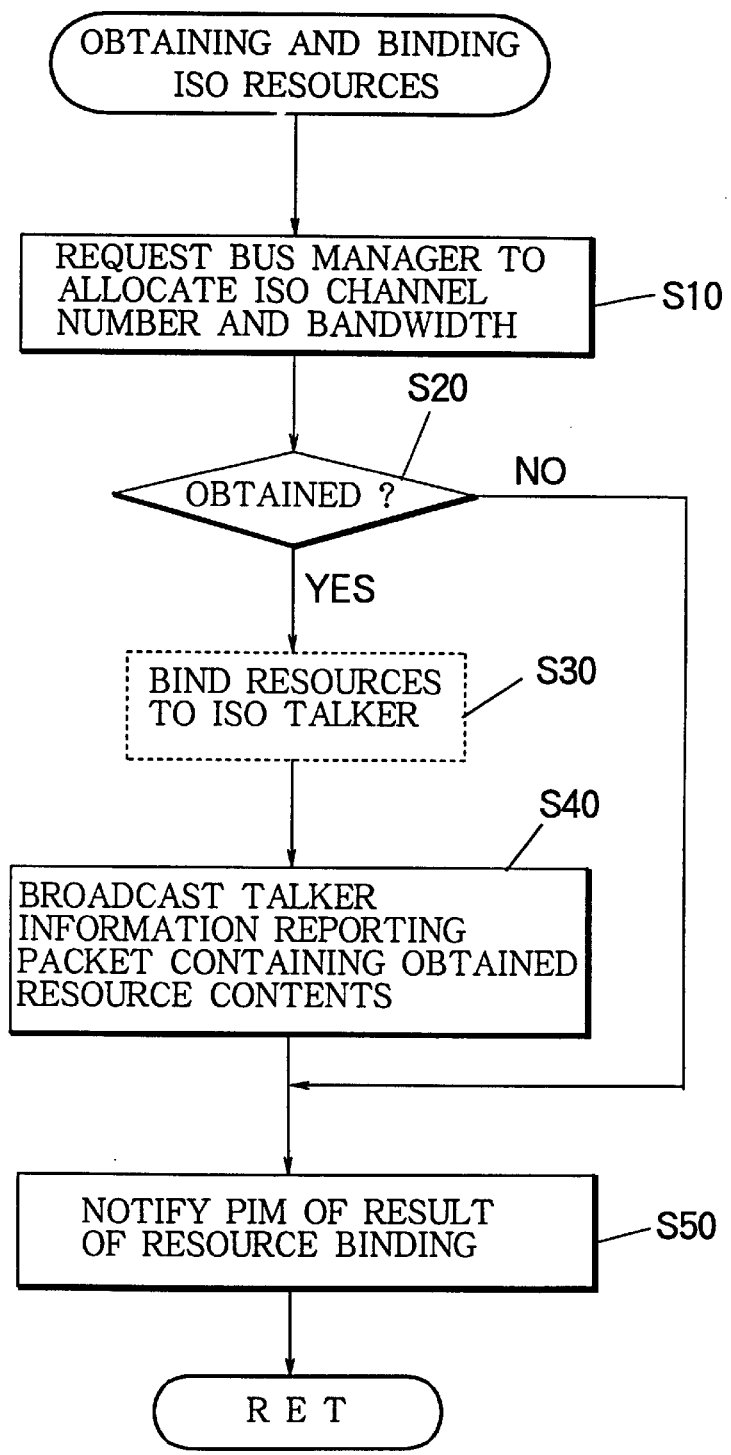
FIG. 10 is a flowchart illustrating acquiring and binding procedures of isochronous resources by an isochronous manager.

Now the obtaining and binding of the isochronous resources are explained referring to FIG. 10. When the isochronous manager 7 receives an Isochronous Manager Bind Resource Request, the isochronous resource is obtained and bound to the isochronous talker as described below. In step S10, the isochronous manager requests the bus manager to allocate an isochronous channel number and a bandwidth. This request is made through an exclusive peer-to-peer transaction with the CSR of the bus manager. Then, the result of the isochronous resource acquisition is tested in step S20. If the resources are obtained successfully, the isochronous manager 7 binds the obtained resources to the isochronous talker in step S30. However, the eventual binding procedure is actually done in the talker information update, so that the binding procedure is illustrated by a dotted block in FIG. 10. Then in step S40, a talker information reporting packet containing the obtained resources formatted as shown in FIG. 9 is broadcasted in order to notify an isochronous talker creation. Then in step S50, the result of the resource binding is reported to the PIM 8. In this case, the success of the resource binding is reported.

As shown in FIG. 9, the talker information reporting packet is comprised of a packet ID indicating that the relevant packet is the talker information reporting packet, followed by a talker port ID, a talker node ID, a Node Unique ID of the talker, and talker resource information.

If the isochronous resources could not be obtained in step S20, the failure is reported to the PIM 8 in step S50. After the process shown above, the created isochronous talker can transmit isochronous packets.

2.3.3 Binding isochronous resources (Listener)

Figure 11:
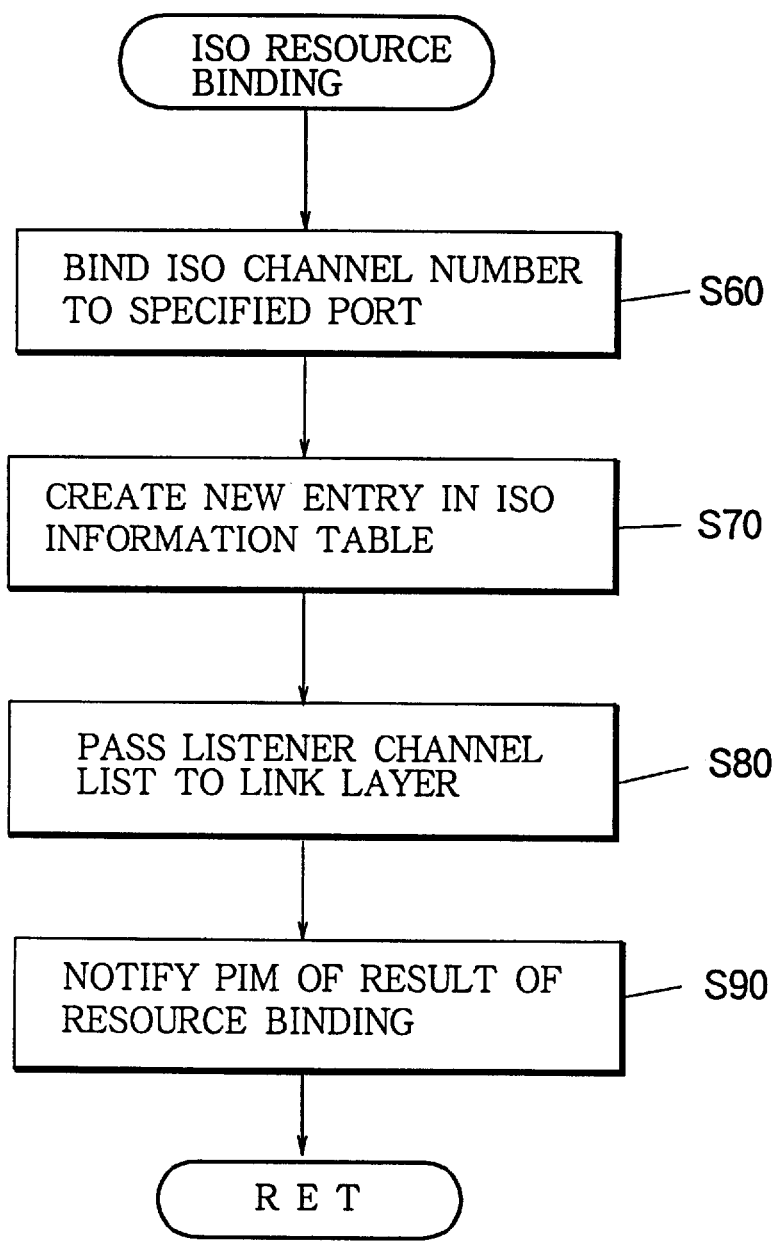
FIG. 11 is a flowchart illustrating the isochronous resources binding procedure.

In order to receive isochronous data, the isochronous manager 7 should bind isochronous resources to an isochronous listener. The isochronous resource binding procedure is shown in FIG. 11. If the isochronous manager 7 receives a request of isochronous resource binding from the upper layer, isochronous resources are obtained and bound to the isochronous listener as described below. In step S60, the isochronous manager 7 on the listener side binds the isochronous channel number of a corresponding talker to a port specified as an isochronous listener. In the listener side, a channel number or bandwidth need not be newly obtained. A received channel number is simply bound to the listener port. However, the channel number bound to the listener port should be the number which is already obtained by the talker port. In step S70, the newly bound listener port information is written in an isochronous information table of the isochronous manager 7. The isochronous information table is illustrated in FIG. 7. As shown in FIG. 7, the table contains a port ID, a port type, and isochronous resources of the talker and listener ports. In step S80, the list of the receiving channel numbers held in the isochronous information table of the isochronous manager 7 is handed to the link layer 2. The link layer 2 receives all the isochronous packets, but notifies only the received packets whose channel number is listed in the list of the receiving channel numbers to the isochronous manager 7. Then in step S90, the result of the resource binding is reported to the PIM 8. However, the resource binding never fails in normal situations, and the success of the resource binding is reported to the PIM 8 in most cases. As shown above, the isochronous resource binding is carried out for the listener port.

2.3.4 Isochronous data transmission

Figure 12A:
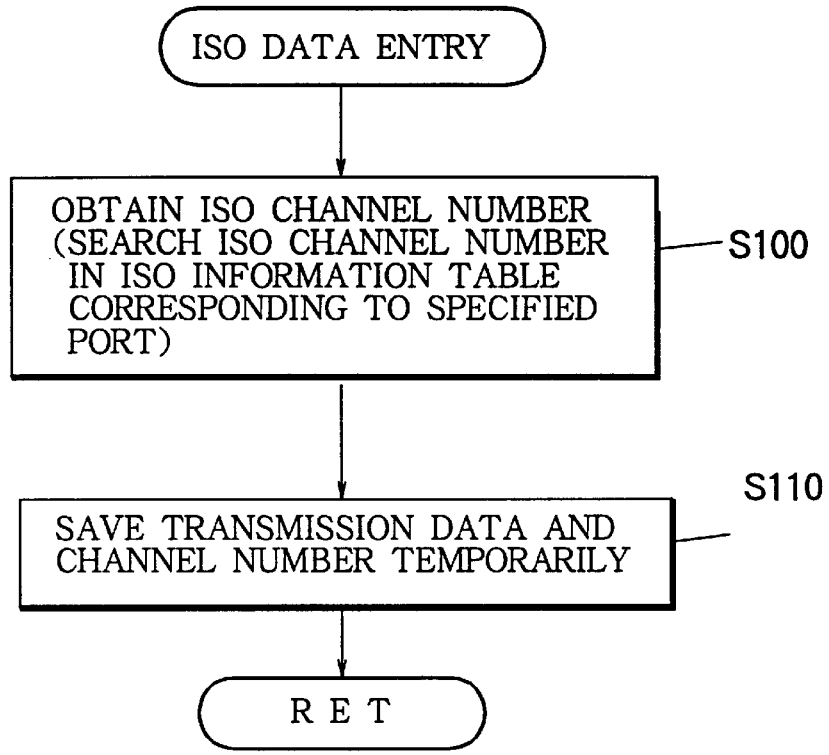
FIGS. 12(a) and 12(b) are flowcharts illustrating isochronous data entry and isochronous transmission procedures by the isochronous manager.
Figure 12B:
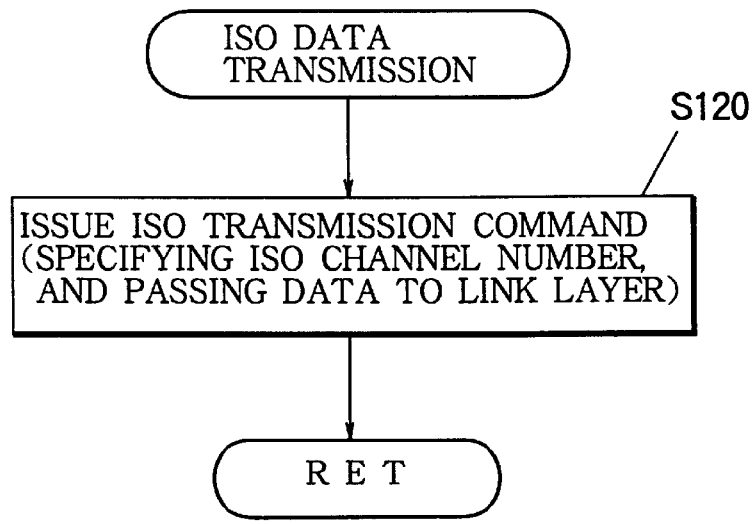

After the isochronous resource binding for the isochronous talker and listener, the isochronous packets are ready to be transferred. In the transmission procedure, data is first accepted, and is then transmitted. The isochronous data acceptance or entry is illustrated in FIG. 12(a), while the isochronous data transmission is shown in FIG. 12(b). If the isochronous manager 7 receives a request to transfer data through the isochronous talker from the PIM 8, the isochronous data entry procedure starts. In step S100, the isochronous manager 7 searches its isochronous information table shown in FIG. 7 to obtain the isochronous channel number bound to the specified isochronous talker. Then in step S110, the data to be transmitted and the searched isochronous channel number are saved temporarily. This buffering is done in order to wait a certain bus cycle, since the isochronous transmission actually starts with notification of an isochronous cycle. If the isochronous transmission data is accepted and the isochronous cycle is notified by the link layer 2, the isochronous data transmission is launched.

Firstly in step S120, the isochronous manager 7 issues an isochronous transmission request to the link layer 2 using the obtained isochronous channel number. In this step, the transmission data is also handed to the link layer 2, and the isochronous transmission data is broadcasted to all the nodes through the link layer 2 and the physical layer 1.

2.3.5 Isochronous data reception

Figure 13A:
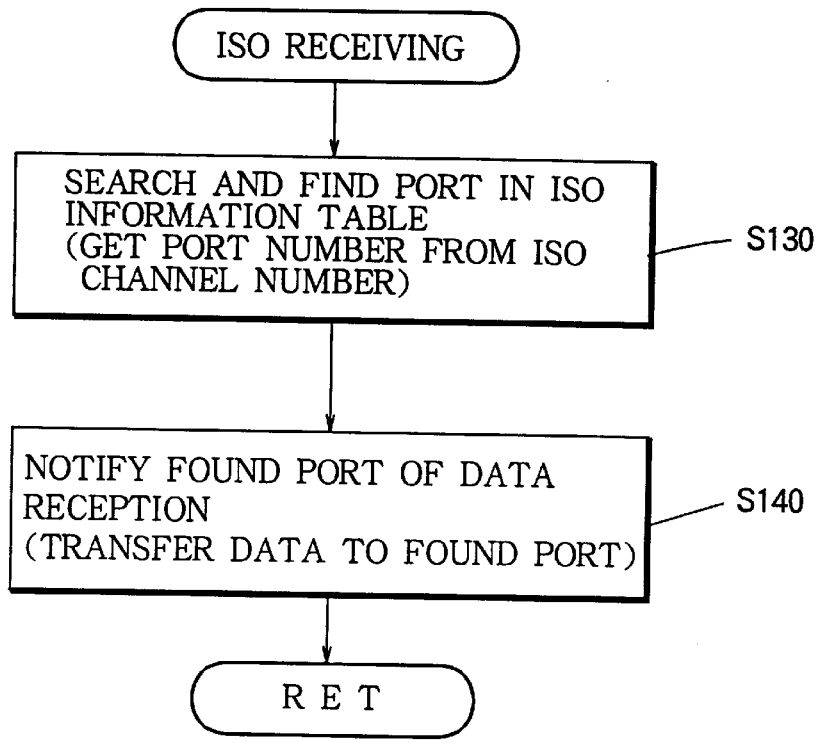
FIGS. 13(a) and 13(b) are flowcharts illustrating isochronous data reception and talker duplication detection procedures by the isochronous manager.

FIG. 13(a) is a flowchart illustrating the isochronous data reception procedure by which the transmitted packet is received. If the isochronous manager 7 is notified of the data reception by the link layer 2, the reception procedure starts. In step S130, the isochronous manager 7 searches its own isochronous information table shown in FIG. 7, to find the destination listener port number through the isochronous channel number attached to the packet. Then in step S140, the isochronous manager 7 notifies the data reception to the found port, and transfers the received data to that port.

2.3.6 Detecting talker duplication

Figure 13B:
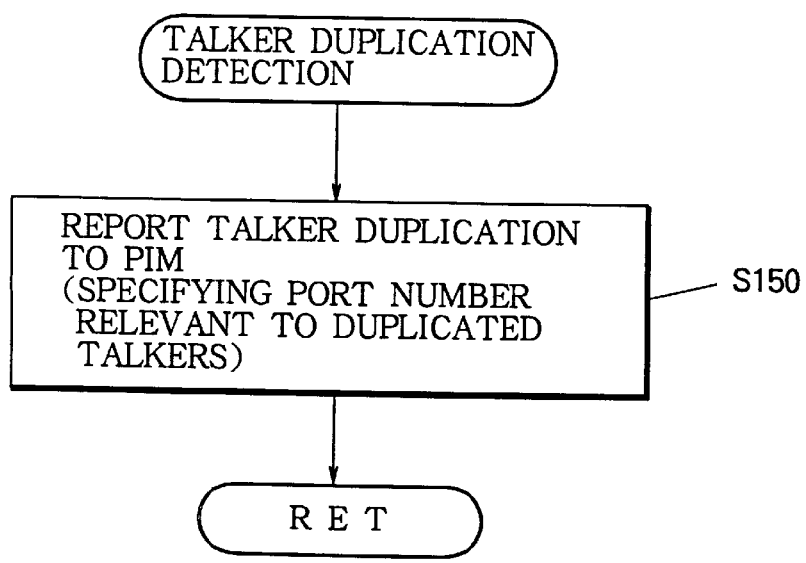

By the way, only one isochronous channel number is bound to only one isochronous talker. In other words, only one isochronous talker transmits packets using a particular isochronous channel number. Thus, if the isochronous manager 7 recognizes that multiple isochronous talkers are sending packets with the same isochronous channel number, the isochronous manager 7 stops notification of the data reception to the upper layer at the level of the link layer 2, and notifies the fact of the channel number duplication to the upper layer. The detection process of the channel number duplication is illustrated in FIG. 13(b). If the talker's channel number is duplicated, the link layer 2 notifies the fact to the isochronous manager 7, which then notifies the duplication to the PIM 8. The notification of the isochronous data reception to the PIM 8 is suspended in the level of the link layer 2.

2.3.7 Communication with lower layer

In the isochronous transmission service, the isochronous manager 7 in the mLAN transport layer 10 communicates with the link layer 2 using service primitives as described below. The mLAN transport layer 10 requests the link layer 2 to transfer an isochronous packet using a service primitive "Link Isochronous Request". A primitive "Link Isochronous Indication" is issued by the link layer 2 to the isochronous manager 7 to notify the arrival of the isochronous packet. A service primitive "Link Cycle Start Indication" is issued by the link layer 2 to the isochronous manager 7 to indicate the start of the isochronous cycle. Upon receiving the primitive, the isochronous manager 7 transfers data using the primitive "Link Isochronous Request". With a primitive "Link Isochronous Control Request", the isochronous manager 7 passes all the channel numbers bound to the isochronous listeners within the node to the link layer 2 as a primitive "Channel Receive List". Upon receiving a packet having a channel number listed in the primitive "Channel Receive List", the link layer 2 issues the primitive "Link Isochronous Indication" to the isochronous manager 7.

2.3.8 Communicating with PIM

The isochronous manager 7 communicates with the PIM 8 as described below. A service primitive "Isochronous Manager Data Request" is issued by the PIM 8 to the isochronous manager 7, and the isochronous manager 7 transfers data specified by the request. A primitive "Isochronous Manager Data Indication" is issued by the isochronous Manager 7 to the PIM 8 to notify the PIM 8 of the arrival of the isochronous packet. A primitive "Isochronous Manager Bind Resource Request" is issued by the PIM 8 to the isochronous manager 7, and the isochronous manager 7 binds resources to the port specified by the primitive. A primitive "Isochronous Manager Bind Resource Confirmation" is issued by the isochronous manager 7 to the PIM 8 to indicate the result of the binding in response to the primitive "Isochronous Manager Bind Resource Request". Primitives "Isochronous Manager Release Resource Request" and "Isochronous Manager Release Resource Confirmation" are exchanged each other by the isochronous manager 7 and the PIM 8 in order to release the resource already obtained.

2.3.9 Bus reset handling

Figure 15:
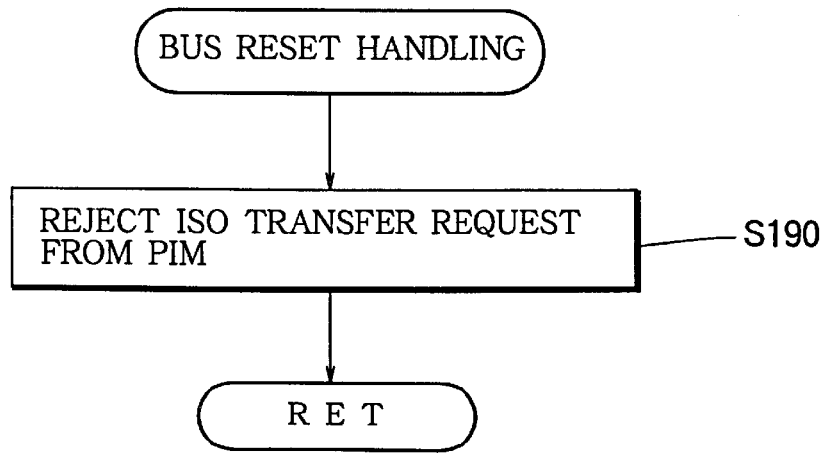
FIG. 15 is a flowchart illustrating bus reset handling procedure by the isochronous manager.

If a new node is added to the bus, the bus reset is executed to reset all the logical paths, and then the paths are reconfigured by allocating new node IDs to the nodes. In this case, a bus reset complete notification procedure is executed after the bus reset handling procedure. The bus reset handling procedure is illustrated in FIG. 15. If the bus reset occurs, the NIM 9 issues a reset request (Isochronous Manager Control Request (Reset)) to the isochronous manager 7, which then launches the bus reset handling procedure. Upon receiving the request, the isochronous manager 7 rejects the isochronous transfer request from the PIM 8 in step S190, thereby effecting the bus reset handling procedure.

Figure 16:
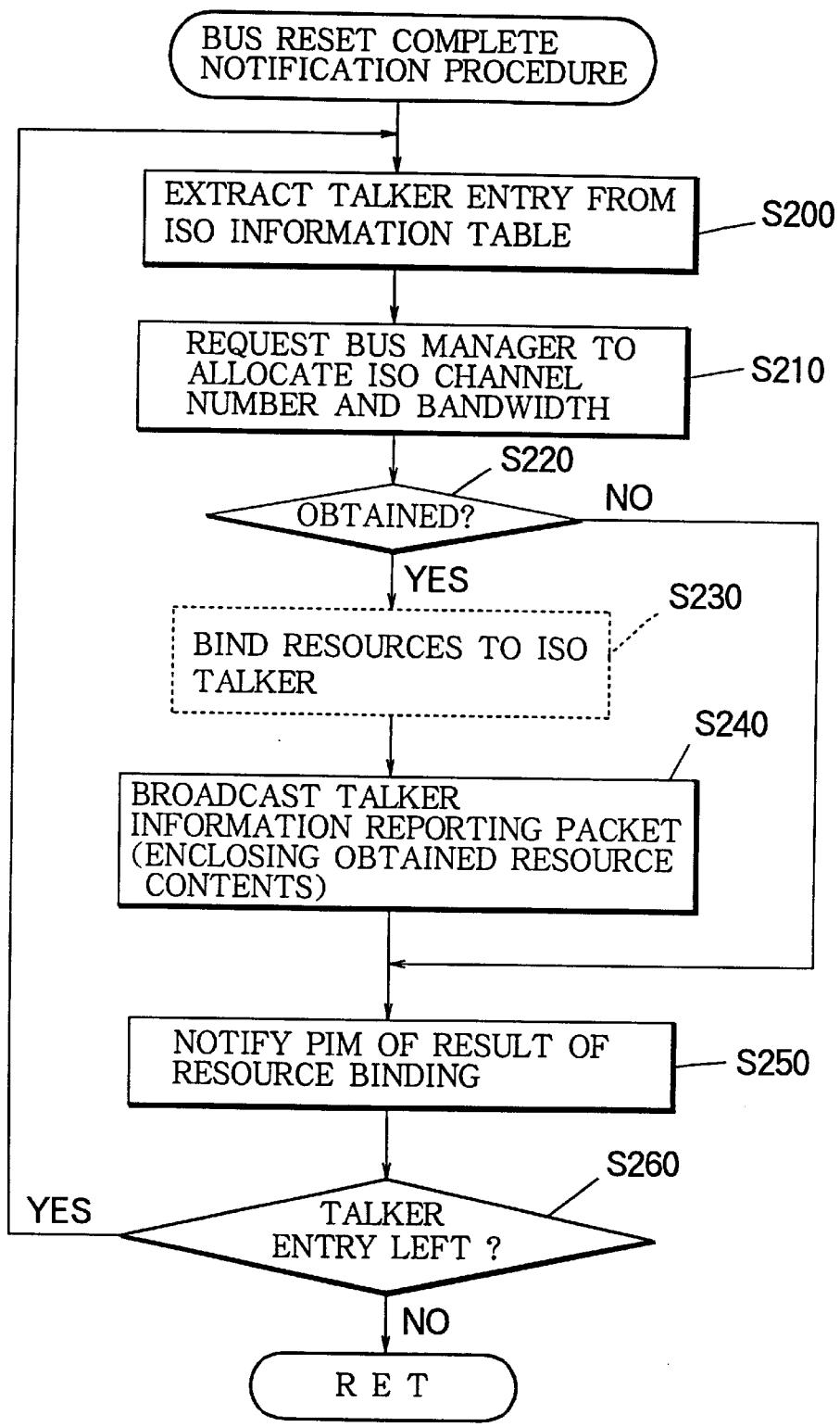
FIG. 16 is a flowchart illustrating bus reset complete notification receiving procedure by the isochronous manager.

After the bus reset is completed, the NIM 9 issues Isochronous Manager Control Reset (Initialize) to the isochronous manager 7. Upon receiving the request, the isochronous manager 7 executes the bus reset complete notification procedure. The bus reset complete notification procedure is illustrated in FIG. 16. First of all in step S200, the isochronous manager 7 extracts a talker entry from the isochronous information table shown in FIG. 7, and requests the bus manager to allocate the isochronous channel number and the bandwidth in step S210. This request is made through an exclusive peer-to-peer transaction with the CSR of the bus manager. Then in step S220, it is tested whether the isochronous resource is successfully obtained or not. If the resource is obtained successfully, the isochronous manager 7 binds the resource to the isochronous talker. However, the eventual binding procedure is actually done in the talker information update, so that the binding procedure is illustrated in a dotted block in FIG. 16. In step S240, a talker information reporting packet containing the obtained resources formatted as shown in FIG. 9 is broadcasted in order to notify an isochronous talker creation. Then in step S250, the result of the resource binding is reported to the PIM 8. In this case, the success of the resource binding is reported. Otherwise, if the isochronous resource could not be obtained in step S220, failure is reported to the PIM 8 in step S250. After step S250, it is tested if there remains a talker entry which has not been bound with isochronous resources yet. If there is such a talker entry, steps S200 to S250 are executed all over again in order to bind isochronous resources to all the talker entries. After all the talker ports are bound with adequate resources, the procedure terminates. Thus, the isochronous manager 7 is ready to accept requests from other layers.

2.3.10 Talker information update

Figure 14:
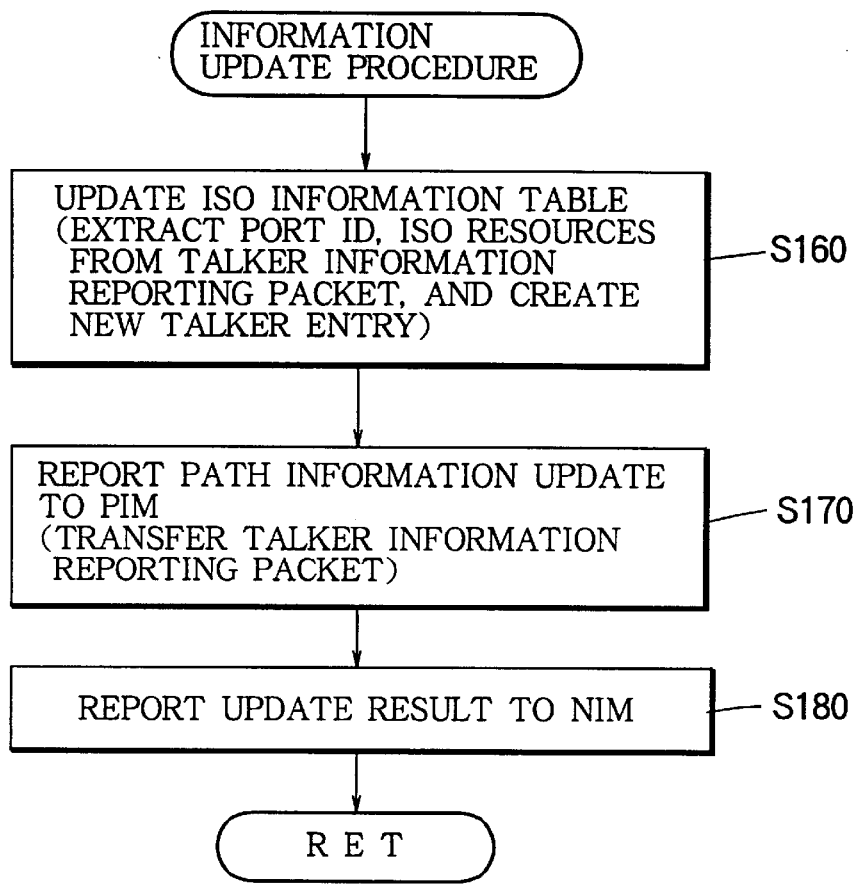
FIG. 14 is a flowchart illustrating talker information update procedure by the isochronous manager.

If the isochronous manager 7 is notified that the NIM 9 has received a talker information reporting packet by means of Isochronous Manager Control Request (Talker Info Received), a talker information update procedure is executed. The talker information update procedure is illustrated in FIG. 14. First of all, the isochronous manager 7 extracts the talker port ID and talker resource information from the talker information reporting packet having the format shown in FIG. 9, and creates a new talker entry according to the extracted information in order to update the isochronous information table shown in FIG. 7. Then in step S170, the talker information reporting packet is passed to the PIM 8 to notify the PIM that the path information is altered. In response to the notification, the PIM 8 updates the path information table as described later. In step S180, the NIM 9 is notified of the update of the isochronous information table. Thus, the talker information update procedure is executed upon receiving the talker information reporting packet, which is broadcasted when a talker port is created in a node. The talker information is updated depending not only on the talker information reporting packet broadcasted from the own node, but also on the talker information reporting packet broadcasted from the other nodes.

2.3.11 Communicating with NIM

For the isochronous manager 7, the NIM issues a service primitive "Isochronous Manager Control Request", which includes parameters listed below.

RESET: Resets the status of the isochronous manager 7.

INITIALIZE: Initializes the status of the isochronous manager 7.

TALKER INFO RECEIVED: Notifies that the NIM 9 has received a talker information reporting packet.

A service primitive "Isochronous Manager Control Confirmation" is issued from the isochronous manager 7 to NIM 9 in order to return the results of the control request made by the "Isochronous Manager Control Request". The status of the isochronous manager 7 is reported by a service primitive "Isochronous Manager Event Indication" issued from the isochronous manager 7 to the NIM 9.

2.4 Multicast transfer service

The multicast transfer service is described below. The multicast data transfer is an asynchronous and connectionless data communication, which is performed from a transmitting port to multiple receiving ports. In the multicast data transfer, the transmitting port is called a "multicast talker", and the receiving port is called a "multicast listener". The multicast data transfer is defined in the mLAN transport layer 10. The application user should bind a multicast channel number to a talker port before starting transmission via the port. This means that the talker port acquires a right to send data through the channel. Only the multicast talker can actually transmit a multicast packet using a certain multicast channel provided that the multicast talker is bound with the channel number. The packet sent from the talker is not addressed to a unique or individual multicast listener, but the packet is broadcasted to all the nodes by the broadcast facility defined in the transaction layer 3.

If a multicast packet arrives at a node, the transaction layer 3 of that node notifies the multicast manager 6 of the arrival.

The received packet is attached with a multicast channel number, which is allocated to the corresponding multicast talker, so that the multicast manager 6 of the designation node determines whether the packet should be accepted or not by examining the attached channel number. Thus, the multicast talker cannot recognize which of the multicast listeners is actually listening.

The multicast channel number bound to the multicast talker is acquired by the binding operation of the multicast manager 6 in the mLAN transport layer 10. The multicast channel number bound to the multicast listener is selected from ones which are already bound to the multicast talkers.

Figure 3:
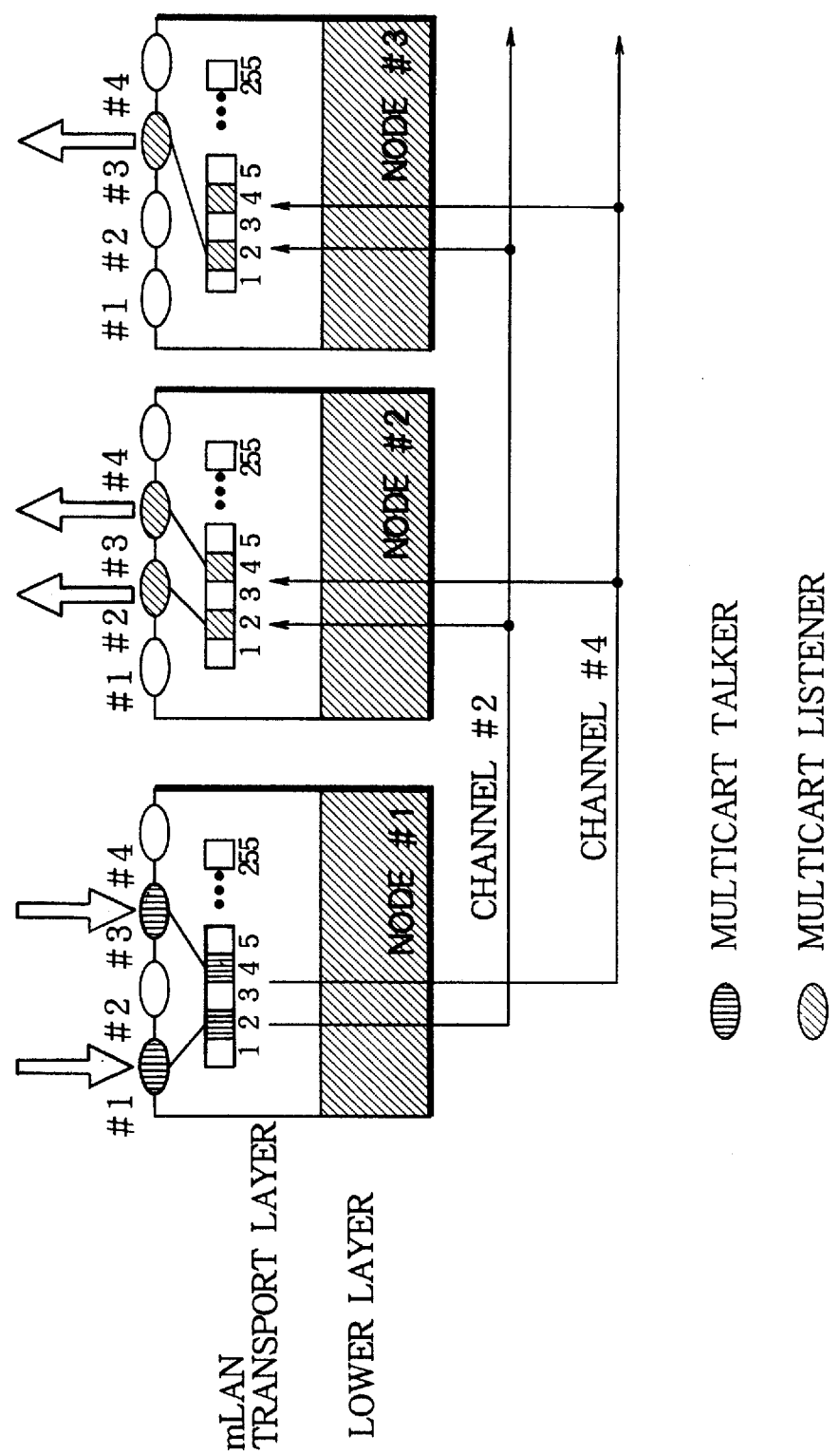
FIG. 3 is a schematic block diagram illustrating multicast transmission in the mLAN.

The mechanism of the multicast transfer is illustrated in FIG. 3. In FIG. 3, ports #1 and #3 of a node #1 functions as a multicast talker. These ports are respectively bound with multicast channel numbers #2 and #4. If a host application issues a transmission request for the port #1 of the node #1, the data is broadcasted to all the nodes in the local bus using the channel #2. Each node receives the transmitted packet by the broadcast facility. Upon receiving, the received packet is passed to the mLAN transport layer 10 from the lower layer which picks up the packet. In the nodes #2 and #3, either of the ports #2 and #3 is functioning as a multicast listener. The mLAN transport layer 10 in each node passes the data of the packet transmitted through multicast channel #2 to its own multicast listener port. Thus, the multicast transfer is carried out. Similarly, the packet delivered to the port #3 of the node #1 is transferred through the channel #4 to each node. The packet is received by the port #3 (bound with the multicast channel number #4) of the node #2. On the other hand in the node #3, the multicast channel #4 is not bound to any port, so that the mLAN transport layer 10 of the node #3 abandons the packet received through the channel.

2.4.1 Multicast manager

The multicast manager 6 is a module to obtain a multicast channel number for a port to execute the multicast transfer, and to bind the same to the port. The multicast manager 6 obtains a multicast channel number by issuing a talker information reporting packet. Further, the manager 6 receives all the talker information reporting packets issued from other nodes within the local bus to create a multicast information table containing correspondence between the multicast channel numbers and the multicast talker ports as shown in FIG. 6. Upon receiving the talker information reporting packet, the multicast manager 6 of each node determines the talker's multicast channel number depending on the order of the reception while organizing the multicast information table shown in FIG. 6. If the multicast manager 6 receives a talker information reporting packet transmitted from its own node, the multicast manager 6 determines the multicast channel number of its own node. The multicast information table is accessed by a multicast listener to search a multicast channel number bound to a corresponding multicast talker. The multicast manager 6 provides the binding information upon a request from the host application. The multicast manager 6 is provided in every node which has a multicast port (multicast talker/multicast listener) to execute the multicast data transfer.

2.4.2 Obtaining and binding multicast resources

Figure 17:
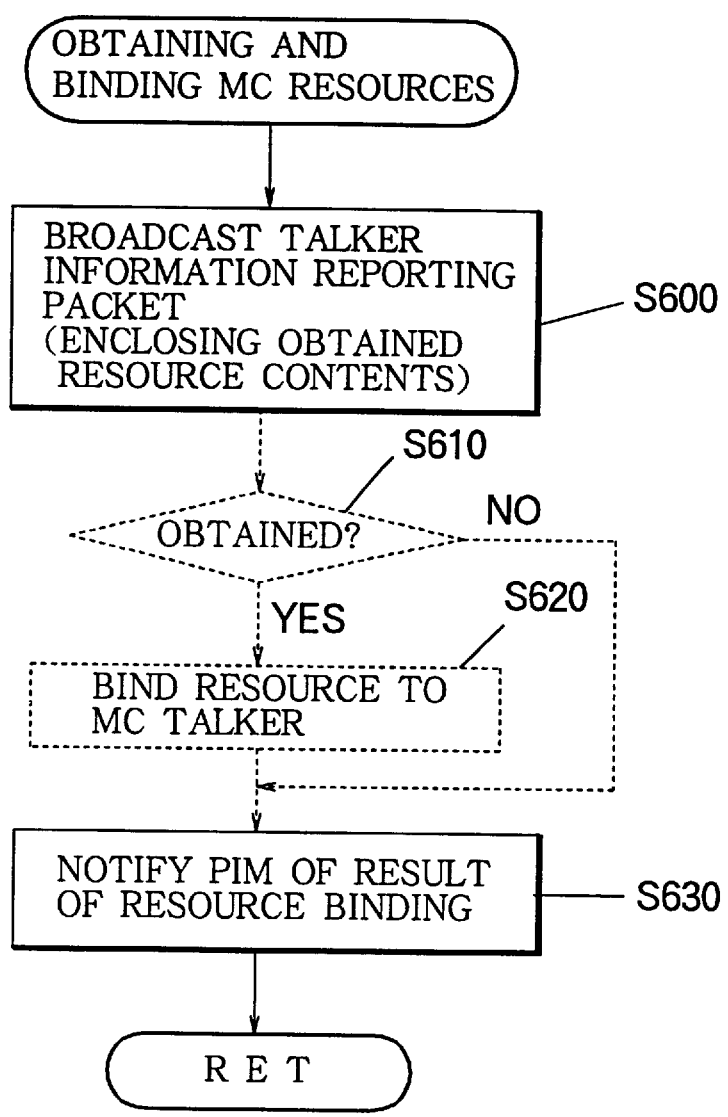
FIG. 17 is a flowchart illustrating acquiring and binding procedures of multicast resources by a multicast manager.

The procedure for obtaining and binding multicast resources is described below referring to FIG. 17. The multicast manager 6 executes the procedure for obtaining and binding multicast resources for a port to create a multicast talker. The procedure is commenced when the multicast manager 6 receives a "Multicast Manager Bind Resource Request" from the upper layer PIM 8. In step S600, the multicast manager 6 broadcasts a talker information reporting packet for all the nodes. The talker information reporting packet is formatted as shown in FIG. 9, and contains an obtained multicast channel number associated with the Node Unique ID and the port ID. If it is recognized that a multicast channel number is successfully obtained in step S610, the obtained resource (multicast channel number) is bound to a specified multicast talker in step S620. Then, the PIM is notified of the result of the resource binding. In this case, the PIM 8 is notified that the binding is successful. On the other hand, if it is recognized that the multicast channel number allocation is failed, the procedure goes forward from step S610 to S630, and the corresponding notification is passed to the PIM 8, which terminates the procedure. The procedure of steps S610 and S620 is shown in dotted blocks, because the actual resource binding process is done by broadcasting a talker information reporting packet in the talker information update procedure described below.

2.4.3 Talker information update

Figure 21:
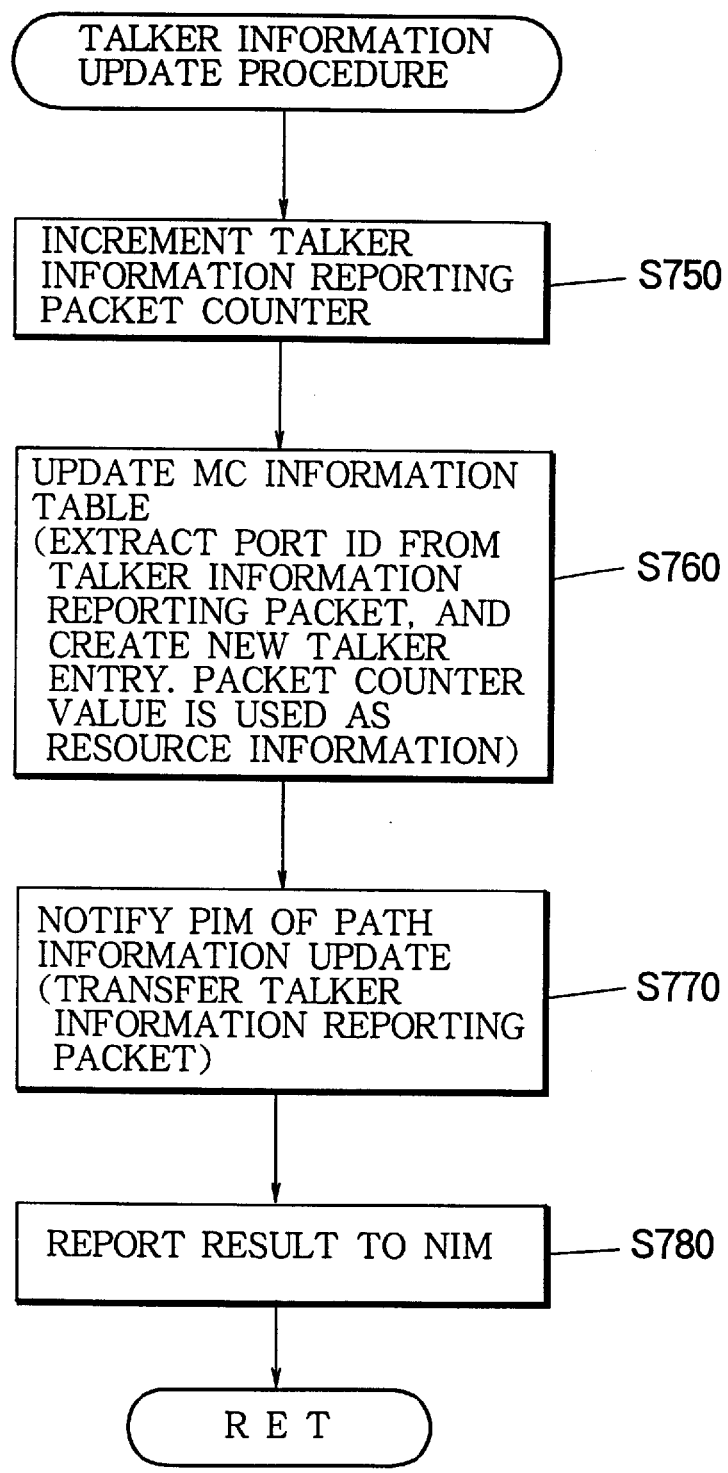
FIG. 21 is a flowchart illustrating talker information update procedure by the multicast manager.

The NIM 9 in each node receives the broadcasted talker information reporting packet, by which the talker information update procedure is controlled. The talker information update procedure is explained hereunder referring to FIG. 21. The procedure is launched when the NIM 9 notifies the multicast manager 6 of the reception of the talker information reporting packet. In step S750, in order to allocate a multicast channel number to each node in the order of arrival of the talker information reporting packet, a packet counter provided in the multicast manager 6 in each node is incremented by "1". The multicast manager 6 has the packet counter, which is reset to "0" upon the bus reset and which counts received talker information reporting packets after the bus reset. In step S760, the multicast manager 6 updates the multicast information table (FIG. 6) containing the correspondence among the Node Unique ID, port ID, and multicast channel number according to the received talker information reporting packet. The port ID is extracted from the talker information reporting packet, and the value of the packet counter is used as the resource information in order to create a talker entry. Then in step S770, the multicast manager 6 sends the talker information reporting packet to notify the PIM 8 of the update of the path information. In step S780, the NIM 9 is notified of the result of the update, which terminates the procedure. The multicast manager 6 which broadcasted a talker information reporting packet uses the counter value at the time of receiving the own packet as the multicast channel number to be bound to a multicast talker of the own node. The maximum number of multicast channels in the local bus is set to 256 (0 to 255). If the packet counter value exceeds the maximum number, the multicast manager 6 reports that fact to the upper layer.

2.4.4 Multicast data transmission

Figure 19:
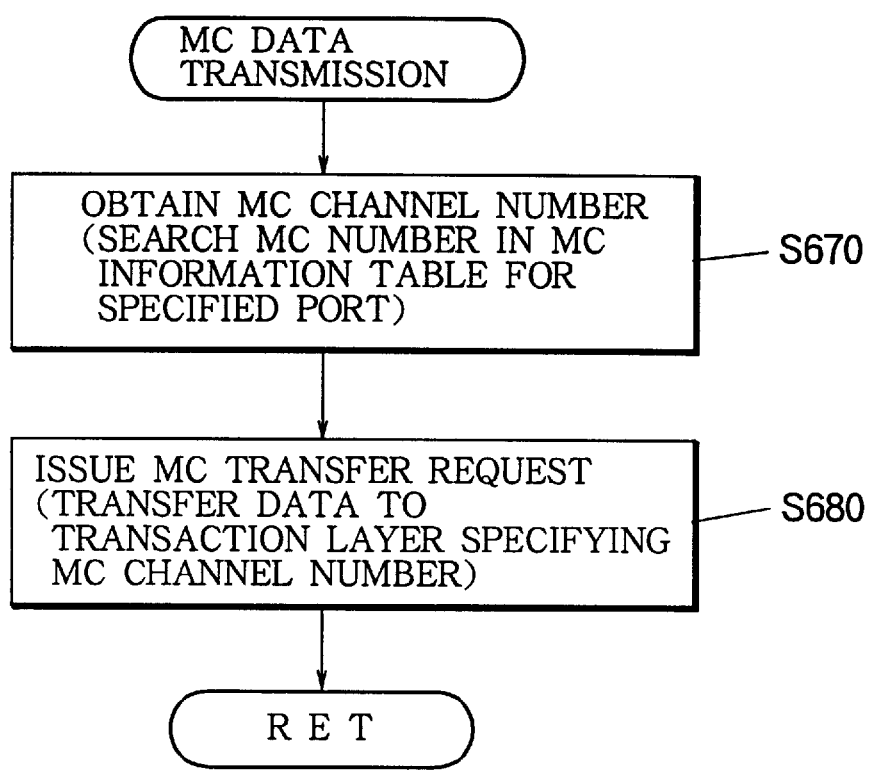
FIG. 19 is a flowchart illustrating multicast transmission procedure by the multicast manager.

The multicast data transmission procedure is described below referring to FIG. 19. The multicast data transmission is initiated when the multicast manager 6 receives data to be transferred from the upper layer PIM 8. In step S670, the multicast manager 6 which has received the data to be sent searches the multicast information table shown in FIG. 6 in order to obtain the multicast channel number bound to the multicast talker to be used. Then, step S680 issues a multicast transfer request while sending the data to be transferred to the transaction layer 3. Thus, the data is multicasted. However in this method, the data is actually broadcasted so that ACK is never returned.

2.4.5 Binding multicast resources (Listener)

Figure 18:
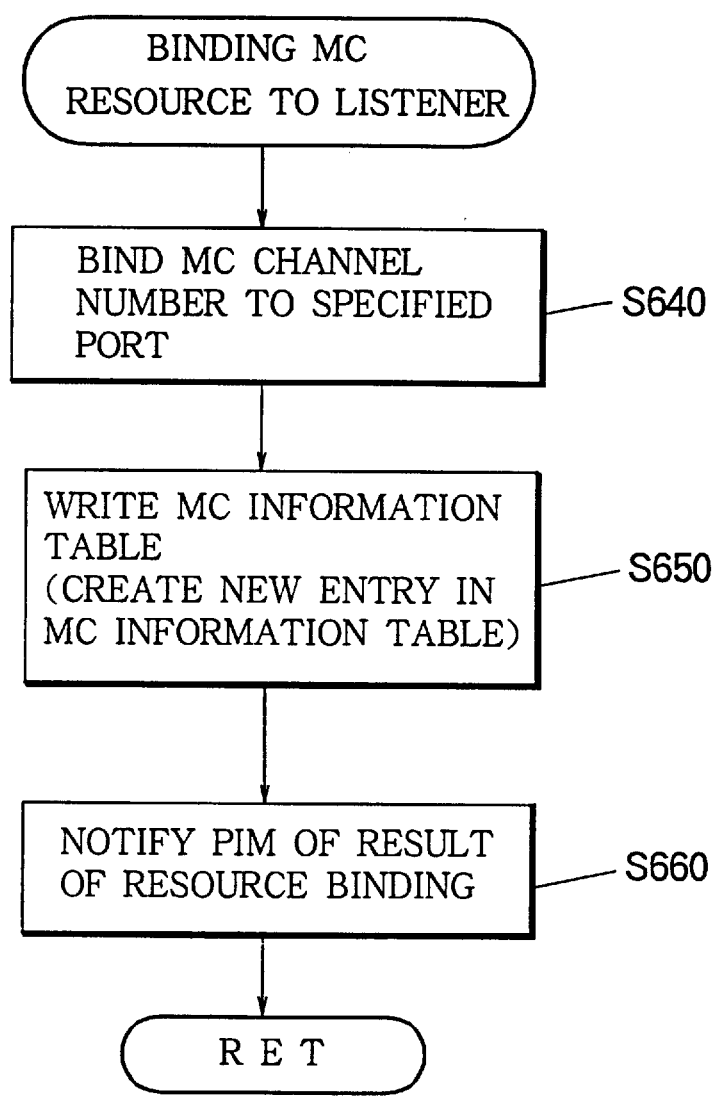
FIG. 18 is a flowchart illustrating the binding procedure of the multicast resources by the multicast manager.

In order to receive a multicast packet by a multicast listener., the same multicast channel number contained in the multicast packet should be provisionally bound to the recipient listener. The binding of the multicast resources is illustrated in FIG. 18. The binding procedure is commenced upon receiving a "Multicast Manager Bind Resource Request" from the PIM 8. First in step S640, the multicast information table is searched, and the specified port is bound with the multicast channel number by which the data is identified. In step S650, the port ID, port type, and multicast resource (multicast channel number) are written as a new entry into the multicast information table. In step S660, the PIM 8 is notified of the result of the binding procedure. The listener resource binding never fails, because there is only a binding request to bind the resource to the channel which has already been allocated to a corresponding talker. Thus, in this case, the PIM 8 is notified of the successful binding, thereby terminating the procedure. After the multicast resource is bound to the multicast listener, the multicast data can be received correctly.

2.4.6 Multicast data reception

Figure 20:
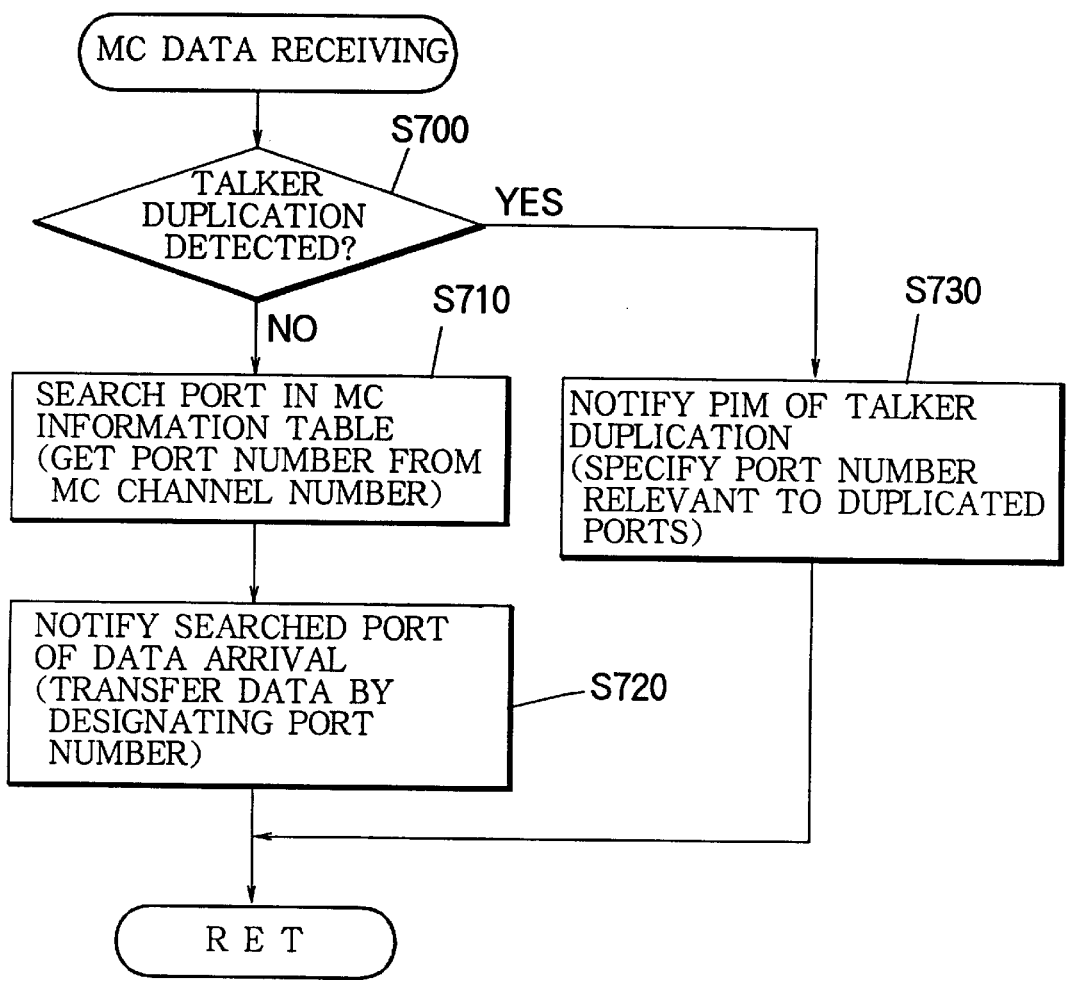
FIG. 20 is a flowchart illustrating multicast receiving procedure by the multicast manager.

The multicast data reception procedure is explained hereunder referring to FIG. 20. The procedure starts by the notification of the data reception from the transaction layer 3. First of all in step S700, the talker duplication is detected if any. The multicast channel number attached to the multicast packet is that bound to the multicast talker which has sent out the packet. Only one multicast talker deserves to be bound with a unique multicast channel number. In other words, each multicast talker transmits packets using a particular multicast channel number. Thus, if the multicast manager 6 recognizes that two or more multicast talkers are sending packets concurrently with the same multicast channel number, the procedure jumps forward to step S730, where the notification of data arrival to the PIM 8 is stopped, and the duplication is reported to the PIM 8 with sending the duplicated channel number information. On the other hand in step S700, if the talker duplication is not detected, the multicast manager 6 searches the multicast information table to identify the attending listener port. Then in step S720, if the received packet has the channel number that coincides with the channel number bound to the multicast listener in the node, the packet reception is notified to that listener. The multicast manager 6 picks up all the multicast packets upon the notification of data arrival from the transaction layer 3. However, the packet arrival is notified to the multicast listener port in the node, only when the multicast channel number coincides with that bound to the listener. Thus, the notified listener can exclusively receive the multicast data packet. If there are two or more destination listeners, the multicast manager duplicates the data to deliver the data to these listeners. In case that the attached multicast channel number is not bound to any listener in the node, the packet is abandoned. As described above, the multicast data reception procedure is executed correctly.

2.4.7 Communicating with lower layer

As shown in the foregoing, the multicast manager 6 in the mLAN transport layer 10 communicates with the transaction layer 3 in order to make the multicast transmission. The mLAN transport layer 10 uses service primitives listed below, which are defined in the transaction layer 3.

Transaction Data Request: the multicast manager 6 issues this primitive to the transaction layer 3 in order to initiate the multicast transmission. The multicast transmission is carried out using the broadcast facility in the transaction layer 3, so that a property BROADCAST WRITE is specified as a Transaction Type.

Transaction Data Indication: with this primitive, the multicast manager 6 is notified of the data arrival by the transaction layer 3.

2.4.8 Communicating with PIM

The multicast manager 6 communicates also with the PIM 8. The service primitives listed below are defined in order for the communication between the multicast manager 6 and the PIM 8 in the upper layer.

Multicast Manager Data Request: the PIM 8 issues this primitive to the multicast manager 6. The multicast manager 6 transfers the data specified by the primitive.

Multicast Manager Data Indication: the multicast manager 6 issues this primitive to the PIM 8 in order to notify that the manager 6 has received a multicast packet.

Multicast Manager Bind Resource Request: the PIM 8 issues this primitive to the multicast manager 6. The multicast manager 6 binds resources to the port specified by the primitive. With this primitive, the PIM 8 passes the port ID and the multicast channel number which is required if the type of the port specified by the port ID is MULTICAST LISTENER.

Multicast Manager Bind Resource Confirmation: the multicast manager 6 issues this primitive to the PIM 8 in order to return the results of the procedure executed in response to the Multicast Manager Bind Resource Request.

2.4.9 Communicating with NIM

The multicast Manager 6 communicates also with the NIM 9 to carry out the multicast data transfer. The service primitives listed below are defined in order for the communication between the multicast manager 6 and the NIM 9 in the upper layer. The NIM 9 uses these primitives to reset or initialize the status of the multicast manager 6.

Multicast Manager Control Request: the NIM 9 issues this primitive to the multicast manager 6. By this primitive, parameters listed below are passed:

RESET: Resets the status of the multicast manager 6.

INITIALIZE: Initializes the status of the multicast manager 6.

TALKER INFO RECEIVED: Notifies that the NIM 9 has received a talker information reporting packet.

Multicast Manager Control Confirmation: the multicast manager 6 issues this primitive to the NIM 9 in order to return the results of the procedure executed in response to Multicast Manager Confirmation Request.

Multicast Manager Event Indication: the multicast manager 6 issues this primitive to the NIM 9 in order to report the internal status of the multicast manager 6.

2.4.10 Bus reset handling

Figure 22:
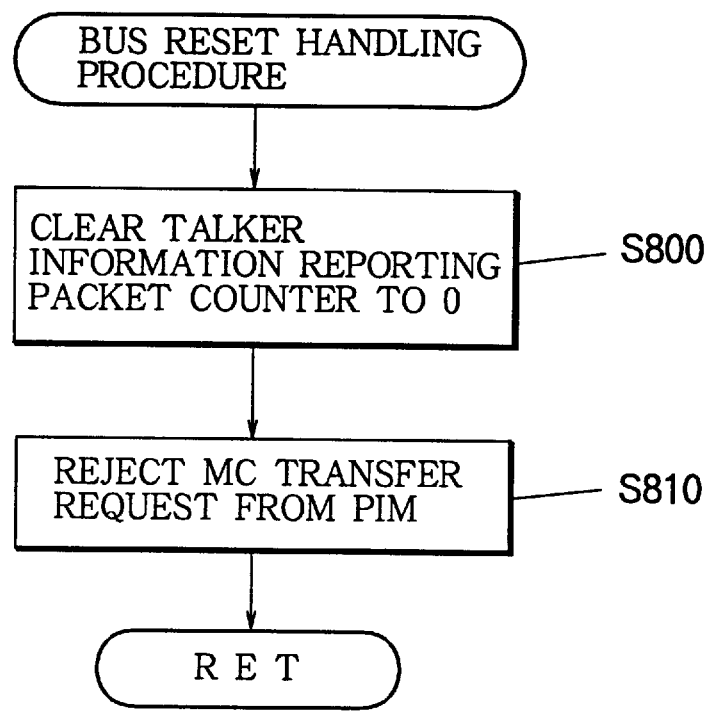
FIG. 22 is a flowchart illustrating bus reset handling procedure by the multicast manager.

The operation of the bus reset is described below. If a new node is introduced into the bus, the bus reset is executed to reset all the paths, and then the paths are reconstructed with allocating new node IDs to the respective nodes. In this case, the bus reset complete notification procedure is executed after the bus reset handling procedure. The bus reset handling procedure is illustrated in FIG. 22. If the bus reset occurs, the NIM 9 issues a reset request (Multicast Manager Control Request (Reset)) to the multicast manager 6, which then launches the bus reset handling procedure. Upon receiving the request, the multicast manager 6 resets a packet counter to "0" in step S800. Further, the multicast manager 6 clears the multicast channel number stored in the multicast information table, and rejects the multicast transmission request from the PIM 8 in step S810, thereby terminating the bus reset handling procedure.

Figure 23:
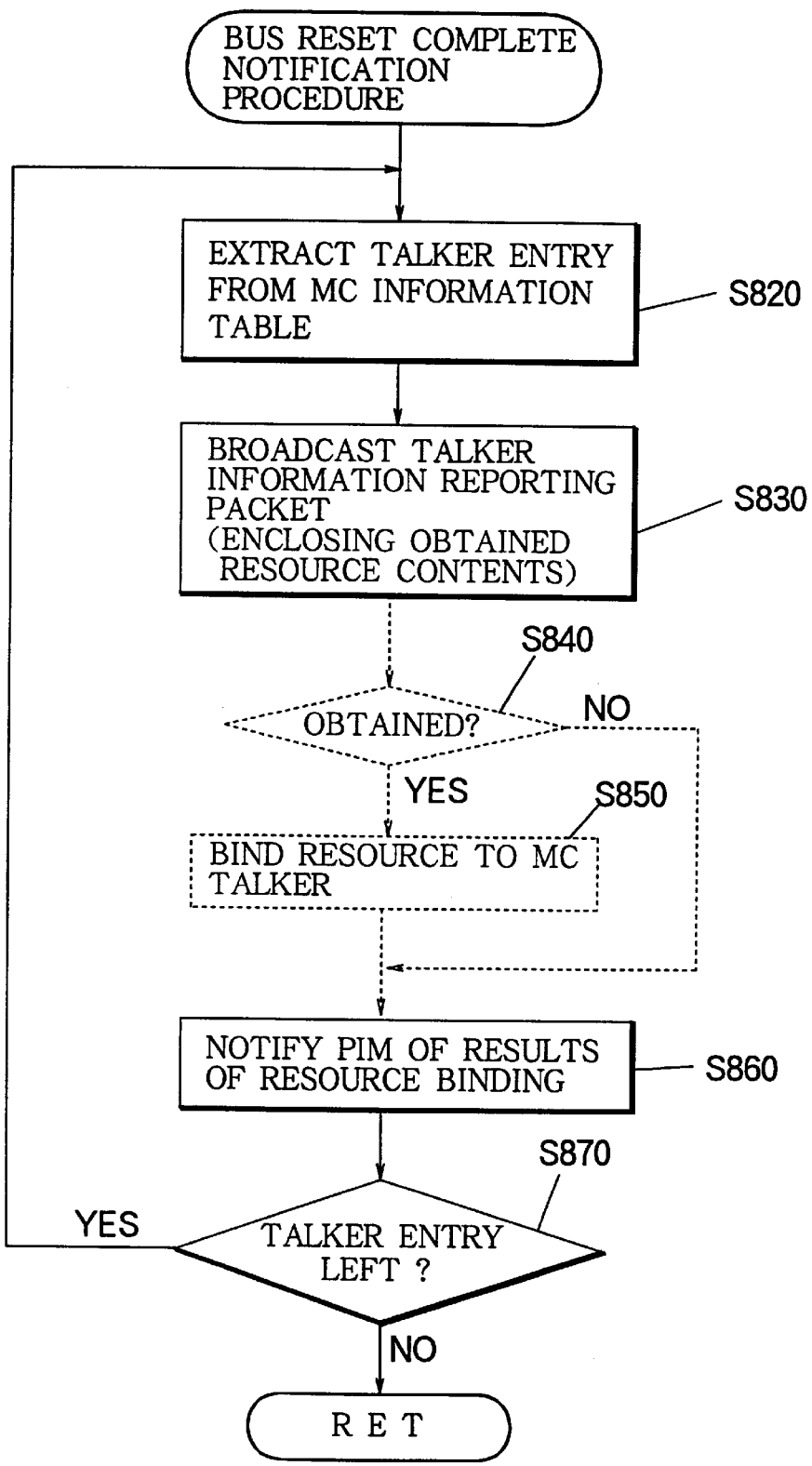
FIG. 23 is a flowchart illustrating bus reset complete notification receiving procedure by the multicast manager.

After the bus reset is completed, the NIM 9 issues Multicast Manager Control Request (Initialize) to the multicast manager 6. Upon receiving the request, the multicast manager 6 executes the bus reset complete notification procedure. The bus reset complete notification procedure is illustrated in FIG. 23. If the multicast manager 6 stores a port ID in its own multicast information table and a multicast channel number corresponding to that port ID is cleared, this means that the multicast channel number bound to the port is cleared by the bus reset. Thus, in step S820, the multicast manager 6 extracts a talker entry, whose resource is cleared in the multicast information table. Then, in step S830, the manager 6 broadcasts a talker information reporting packet containing the resource (the multicast channel number). In step S840, it is tested if the resource is newly obtained. If the resource is obtained, the procedure goes forward to step S850, where the resource (the obtained multicast number) is bound to the talker entry. Then, in step S860, the PIM 8 is notified of the result of the resource binding. In this case, the PIM 8 is notified of the successful resource binding. On the other hand, if it is recognized that the resource allocation has failed in step S840, the PIM 8 is notified of the failure. The steps S840 and S850 are illustrated in dotted blocks as the same reason as in the former section 2.4.5 (Binding multicast resources). Then, in step S870, it is tested if there is a remaining talker entry to which no multicast resource is bound. If there is such an entry, the multicast resource binding procedure is carried out again with returning back to step S820 in order to bind the resource to all the talkers. If all the multicast talkers are bound with the multicast resources, the procedure is terminated.

2.5 PIM (Path Information Manager)

The PIM (Path Information Manager) 8 in the mLAN transport layer 10 will be described hereunder. The PIM 8 is provided in the mLAN transport layer 10, and the PIM 8 sets or configures a logical path between a talker port and a listener port. The PIM 8 saves the path information representative of the path already configured, and the PIM 8 automatically reconfigures the path after the initialization caused by a bus reset. However, the PIM 8 maintains the path information only for the ports to handle the two transmission modes, which are the isochronous transmission and the multicast transmission, among the three transmission modes defined in the mLAN transport layer 10.

The PIM 8 provides services as listed below for upper layers.

A. Path configuration/release: Configures a path between ports handling the isochronous transmission and the multicast transmission. Configured paths can be released as well.

B. Path information memory: Stores the path information configured by the PIM 8 services. The PIM 8 stores the path information even while the power is turned off, and the logical paths are reconfigured according to the stored path information.

C. Reconfiguration of path after power-on: After the initialization of the bus caused by power-on, the PIM 8 automatically reconfigures the paths and restores the initial status of the path configuration.

D. Path information exchange: Upon request of host applications, the PIM 8 makes inquiry about the path information to other nodes using a path information administration protocol. The other nodes include a floppy disk drive, for example.

The PIM 8 also provides a service to set and reset a path between a listener port on its local node and a talker port on a remote node. However, the PIM 8 cannot configure a path between talker and listener ports if they are both located in a remote node. This facility is provided by the bus manager as a host application.

2.5.1 Path setting

Figure 24:
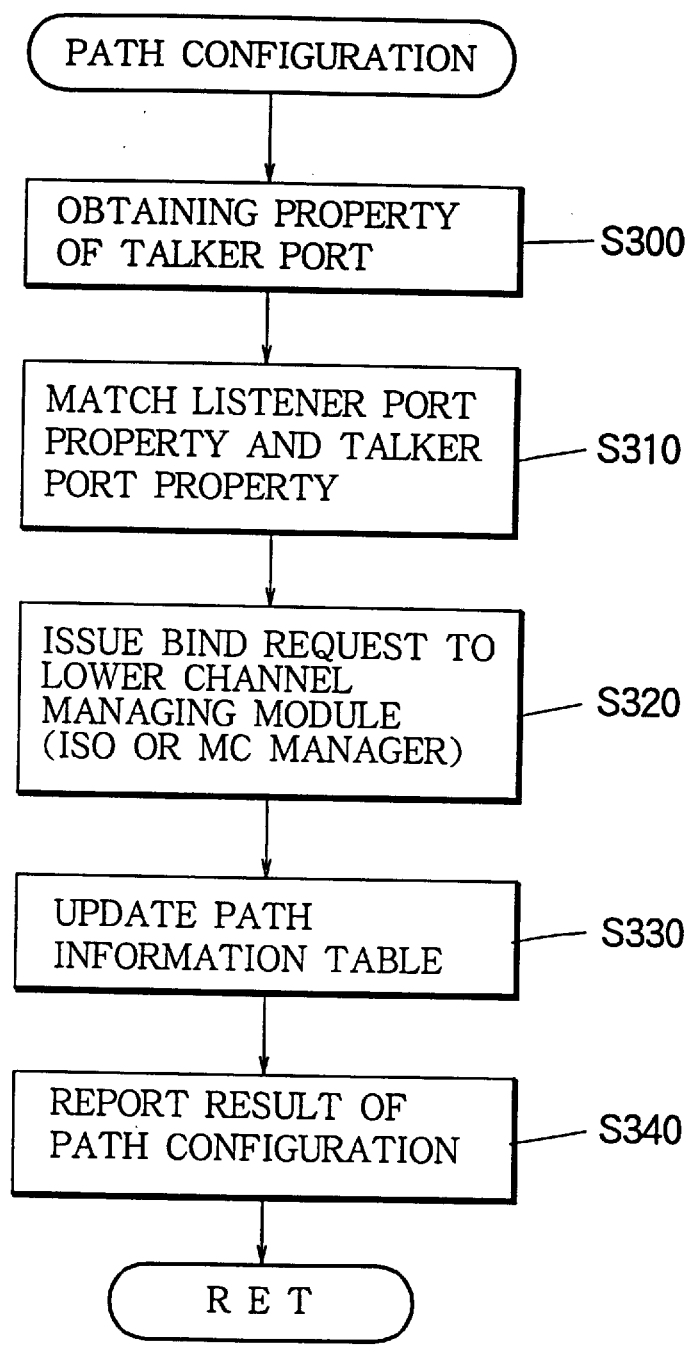
FIG. 24 is a flowchart illustrating path configuration procedure by a PIM.

The path configuration procedure of the PIM 8 is illustrated in FIG. 24. The procedure is launched when the PIM 8 receives a request "PIM Set Path Request" from the host application. Upon receiving the request, the PIM 8 obtains the property of a relevant talker port in step S300. Then in step S310, the PIM 8 sets the same property for the relevant listener port as the talker's property, which is previously acquired in step S300. In step S320, the PIM 8 requests the lower layer module (the isochronous manager 7 if the port type is isochronous, or the multicast manager 6 if the port type is multicast) to bind resources. The resource is bound only to the listener in this stage, since the talker is already bound with the resource. If the path is successfully set, the path information table is updated in step S330. In this update, a connection flag is changed from "Disconnected" to "Connectced". In step S340, the result of path configuration is reported to the host application in response to the request therefrom. In this case, the success of the path configuration is notified. The above-described path configuration never fails, because the actual path configuration is done by copying the already obtained resources of the talker to the listener. Thus, the path configuration is completed.

2.5.2 Data transmission to path

Figure 25:
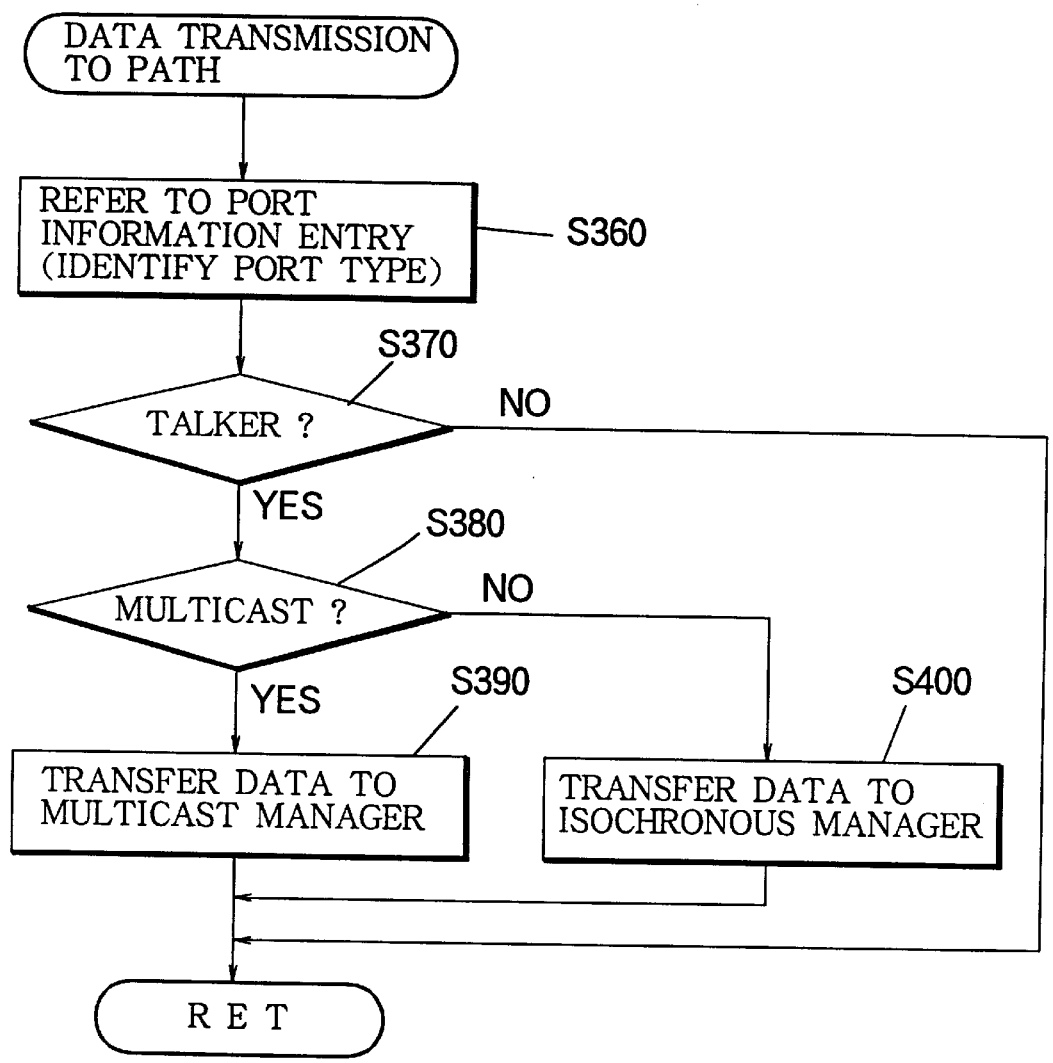
FIG. 25 is a flowchart illustrating data transmission to a path by the PIM.

Data transmission to the path is described hereunder referring to FIG. 25. The transmission procedure is commenced when the PIM 8 receives data to be transmitted from the upper layer. In step S360, the type of the port to transmit data is identified by referring to the port information entries, which are maintained by the NIM 9 and formatted as shown in FIG. 8. In step S370, it is tested whether the port type is talker or not. If the port type is talker, it is tested whether the port type is multicast or not in step S380. If the port is found to be a multicast port, the PIM 8 transfers the data to the multicast manager 6. The multicast manager 6 executes the multicast transmission procedure as described above. If the port is found to be an isochronous port, the procedure goes forward from step S380 to S400, where the data is sent to the isochronous manager 7. The isochronous manager 7 executes the isochronous transmission procedure shown in FIG. 12, thereby terminating the transmission procedure. If it is detected that the port is not a talker in step S370, the procedure is terminated.

2.5.3 Releasing path

Figure 26:
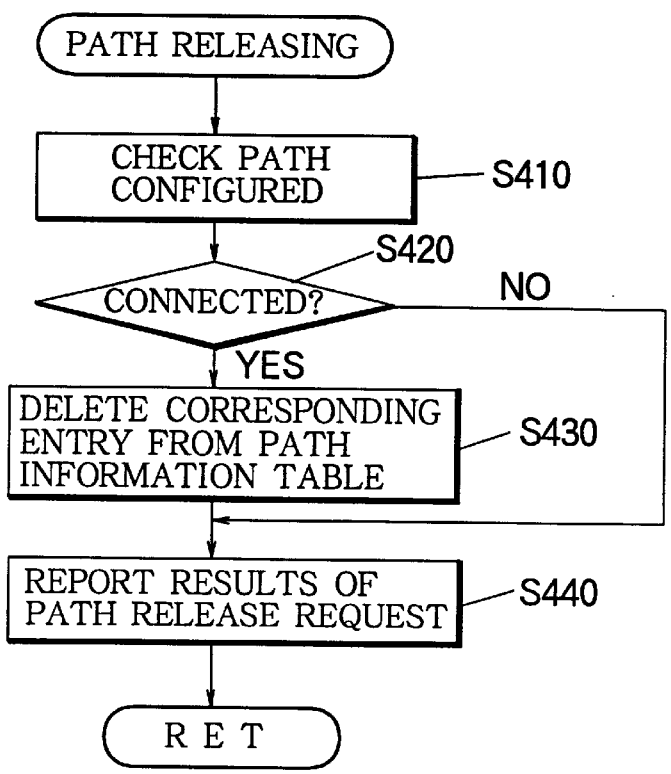
FIG. 26 is a flowchart illustrating path release procedure by the PIM.

The path release procedure is shown in FIG. 26. The existing path information is stored in the path information table maintained by the PIM 8 on the listener node. The PIM 8 executes the actual path releasing procedure. The path is released without confirmation by the talker. When the PIM receives a request "PIM Release Path Request" from the upper layer, the path release procedure is launched. In step S410, the PIM 8 checks that the path specified by the request is set for the relevant listener port by searching the path information table shown in FIG. 4. In step S420, it is tested whether the path is held in a connected state or not. If the path is connected, the resource bound to the listener port is released, and the corresponding entry is deleted from the path information table in step S430. Then, in step S440, a response to the request is returned to the upper layer. In this case, the successful release is reported. If the path is not in the connected state in step S420, the corresponding response is returned to the upper layer in step S440.

Figure 27:
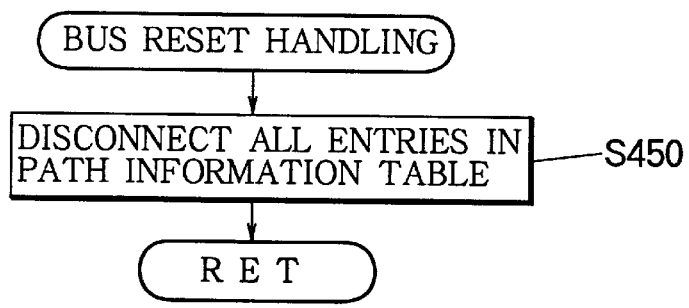
FIG. 27 is a flowchart illustrating bus reset handling procedure by the PIM.

2.5.4 Bus resetting, talker information handling, and unsuccessful event notification The mLAN transport layer 10 dynamically allocates a channel to use the asynchronous multicast transmission, so that the talker must obtain a new multicast channel number upon bus reset. Thus, the multicast channel number bound to a talker may differ before and after the bus reset. Consequently, the listener cannot receive data without setting the same channel number as the talker after the bus reset. Thus, the PIM 8 executes a bus reset handling procedure at first, and then executes a talker information update procedure. The bus reset handling procedure is described below referring to FIG. 27. The bus reset handling procedure is launched when the NIM 9 issues a request "PIM Control Request (Reset)" to the PIM 8 upon bus reset. On receiving the request, the PIM 8 sets all connection flags of the entries in the path information table to "DISCONNECTED" in step S450. In this state, the path information table is retained, but the data transfer according to the path information is disabled. After the bus reset is completed, all the nodes re-bind resources to isochronous and multicast talkers in their nodes. If the resource re-binding is successful, the updated information concerning the talkers are broadcasted in the form of the talker information reporting packet formatted as shown in FIG. 9.

Figure 29:
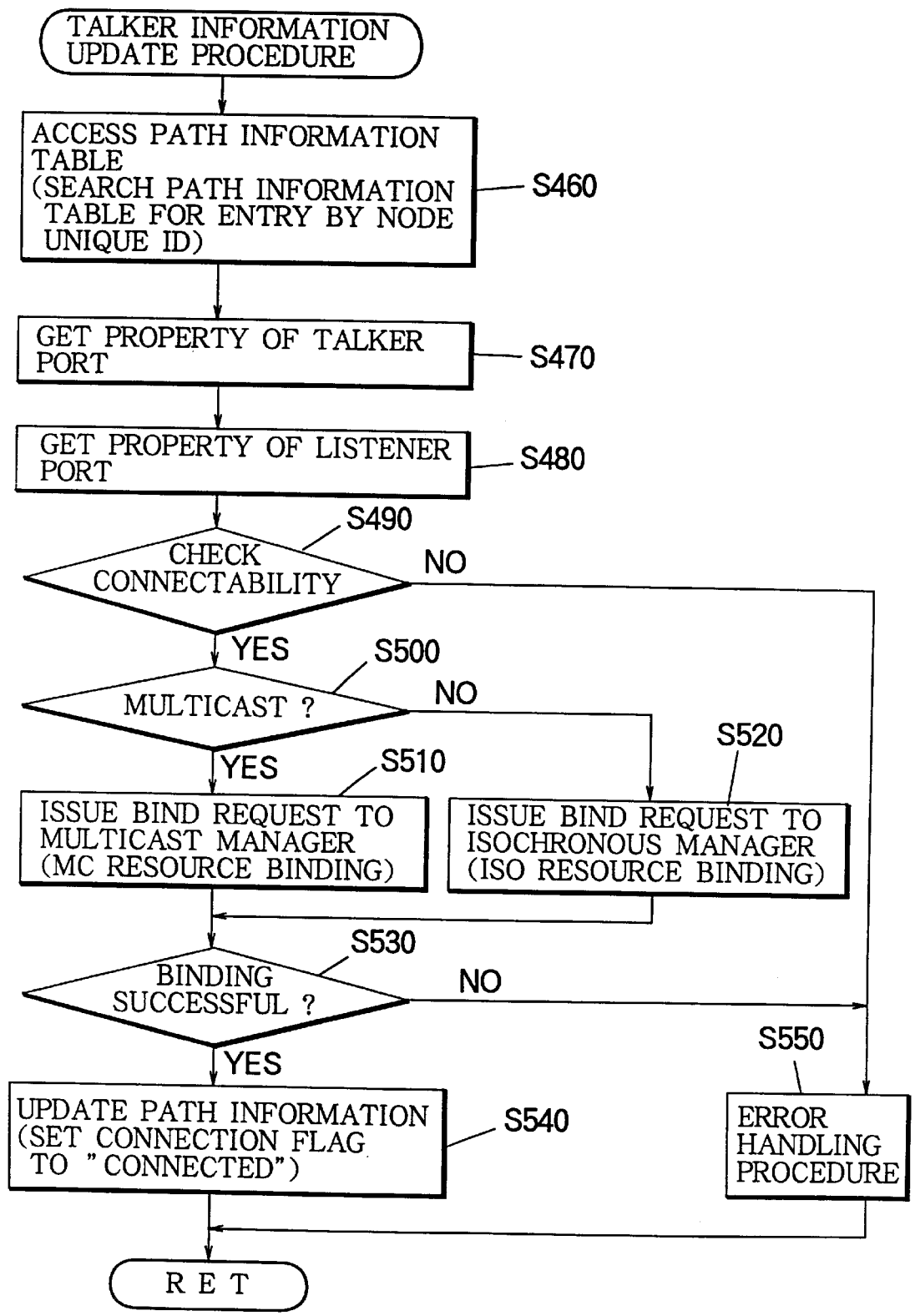
FIG. 29 is a flowchart illustrating talker information update procedure by the PIM.

The arrival of the talker information reporting packet is notified from the multicast manager 6 or the isochronous manager 7 to the PIM 8 (via IM Event Indication (), or MM Event Indication ()), so that the talker information update procedure is launched. The talker information update procedure is shown in FIG. 29. In step S460, the PIM 8 in each node searches the node unique ID in the path information table to find out the entry of the talker relevant to the received talker information reporting packet. Then, the property of that talker is identified in step S470. Further, the property of the listener which is connected to the talker is identified in step S480. In step S490, it is tested whether the talker and the listener can be connected to each other. If the talker and the listener can be connected, whether the port type is multicast or not is tested in step S500. If the port type is multicast, the PIM 8 requests the multicast manager 6 to bind multicast resources. Otherwise, if the port type is isochronous, the PIM 8 requests the isochronous manager 7 to bind isochronous resources. Upon receiving the request, these lower layer modules bind resources to the relevant listeners, and then return the results to the PIM 8. Examining the returned results, the PIM 8 recognizes whether the resource binding is successful or not in step S530. If the resource is successfully bound, the connection flag in the path information table is set to "Connected" in step S540. On the other hand, if the relevant talker and the listener cannot be connected to each other, error handling procedure is executed in step S550. The error handling procedure in step S550 is also executed if the resource binding fails in step S530. Thus, the talker information update procedure is completed.

The PIM 8 executes the talker information update procedure whenever the PIM 8 receives the talker information reporting packet. However, if a node having a talker active before the bus reset is removed and does not exist any more after the bus reset is completed, the talker information reporting packet is not broadcasted. In this case, the path entry corresponding to the talker of the removed node is left as being "DISCONNECTED", so that the path is not restored even if the old path information is retained. In such a case, the path information is retained as it was, so that the path can be reconfigured if a talker information reporting packet is broadcasted in response to recovery of the once removed node on a next bus reset. The PIM 8 may provide a service to erase such "retained but disconnected" path information for the upper layer. With the reconfiguration of the path, the host applications can resume transfer data before and after the bus reset.

Figure 28:
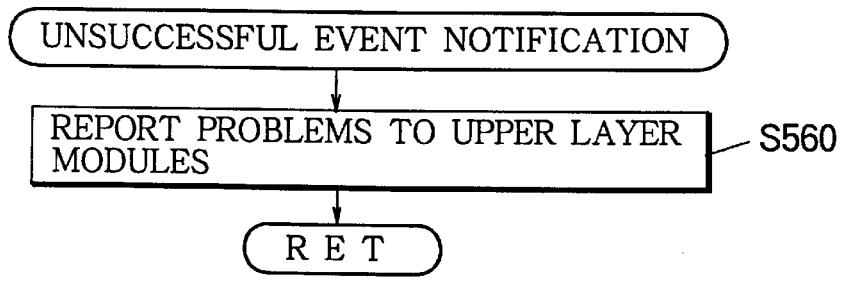
FIG. 28 is a flowchart illustrating unsuccessful event notification procedure by the PIM.

The PIM 8 executes an unsuccessful event notification procedure shown in FIG. 28. The PIM 8 passes various unsuccessful event reports from the lower layer modules to upper layer modules.

2.5.5 Communicating with NIM

The PIM 8 provides service primitives listed below for communicating with the NIM 9.

PIM Control Request
PIM Control Confirmation
PIM Event Indication

The NIM 9 uses these service primitives to reset or initialize the PIM 8 internals.

2.6 NIM (Node Information Manager)

The NIM 9 is located in the mLAN transport layer 10 of each node, and has facilities listed below.

A. Initialization of the mLAN transport layer 10 according to the bus status

The NIM 9 functions as the upper layer of the node controller 4. The NIM 9 resets or initializes the internal modules in the mLAN transport layer 10 depending on the change in the bus status notified by the node controller 4.

B. Providing node information for remote nodes

The mLAN transport layer 10 provides services to exchange data between ports, but a host application cannot access the internal addresses in remote nodes. Each node has registers to store various information and configuration located in its internal addresses. In order to access such addresses in remote nodes, the NIM 9 provides an interface for the host applications. The NIM 9 has a transaction port to accept inquiries from remote nodes. The transaction port is called NIM port. The port ID of the NIM port is the same all over the nodes, and all the nodes should know the port ID in advance. Upon an inquiry, the NIM 9 returns information relevant to the inquiry by accessing the configuration ROM entries, port information entries and so on.

C. Talker information reporting packet handling

The talker information reporting packet is issued by the isochronous or multicast manager in case that an isochronous or multicast talker port is created. The talker information reporting packet is issued for the NIM ports of all the nodes in order to deliver the information relevant to any talker port. Upon receiving the packet, the NIM 9 passes the packet contents to the isochronous manager 7 or to the multicast manager 6. Which manager is addressed is determined depending upon the resource bound to the talker port. The operation of the NIM 9 providing the facilities above will be described hereunder.

2.6.1 Port information inquiry

Figure 30:
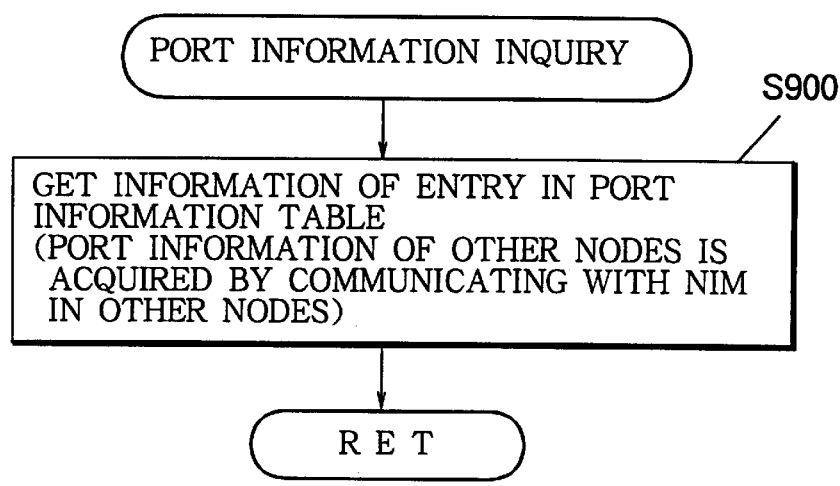
FIG. 30 is a flowchart illustrating port information inquiring procedure by an NIM.

In binding of resources to a listener port within the own node, the host application should know the resource bound to the relevant talker port. In order to obtain such resources, the host application inquires the NIM to get or collect the information of the talker port. The port information inquiry procedure is shown in FIG. 30. Upon receiving the inquiry request the NIM 9 starts the procedure. In step S900, the NIM 9 accesses the port information table to obtain information of an entry of the port relevant to the inquiry, and returns the obtained information to the upper layer. The information of a port provided in a remote node is derived by making a transaction to and from a corresponding NIM in the relevant node. The port information includes the port type and the resource information, which are returned to the host application.

2.6.2 Talker information reporting packet handling

Figure 31:
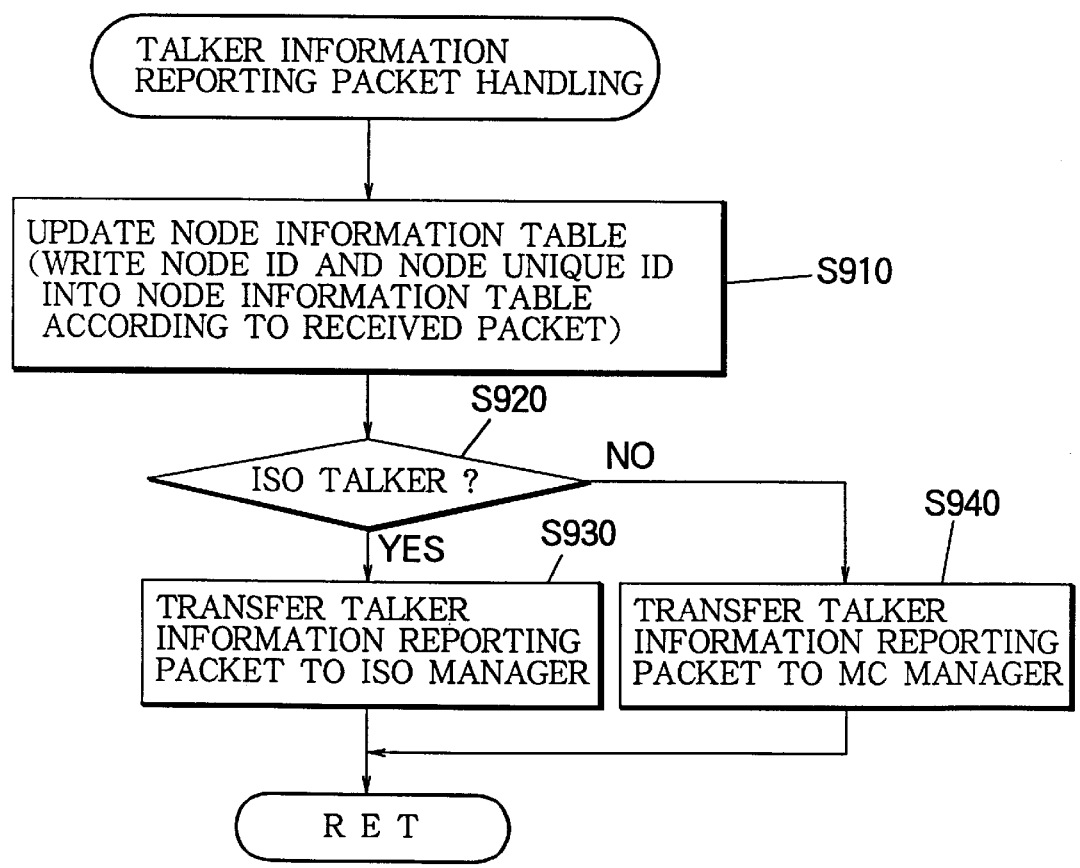
FIG. 31 is a flowchart illustrating handling procedure of a talker information reporting packet by the NIM.

Upon receiving the talker information reporting packet, the NIM 9 executes a handling procedure for the packet, which is shown in FIG. 31. Upon reception of the talker information reporting packet, the NIM launches the procedure in step S910, where the node information table is updated by writing the node ID and the node unique ID included in the packet into the node information table. Then in step S920, it is tested whether the type of the talker is isochronous or multicast according to the resource bound to the talker port relevant to the packet. If the talker port is an isochronous talker, the talker information reporting packet is transferred to the isochronous manager 7 in step S930. On the other hand, if the talker port is a multicast talker, the reporting packet is transferred to the multicast manager 6 in step S940. The packet transfer to the upper layer terminates the packet handling procedure.

2.6.3 Communicating with lower layer

The NIM .9 uses service primitives provided by the node controller 4 to communicate therewith. The node controller 4 provides the service primitives listed below.

SB Control Request (SB_CONTROL.request)
SB Control Confirmation (SB_CONTROL.confirmation)
SB Event Indication (SB_EVENT.indication)

2.6.4 Bus reset handling

Figure 32:
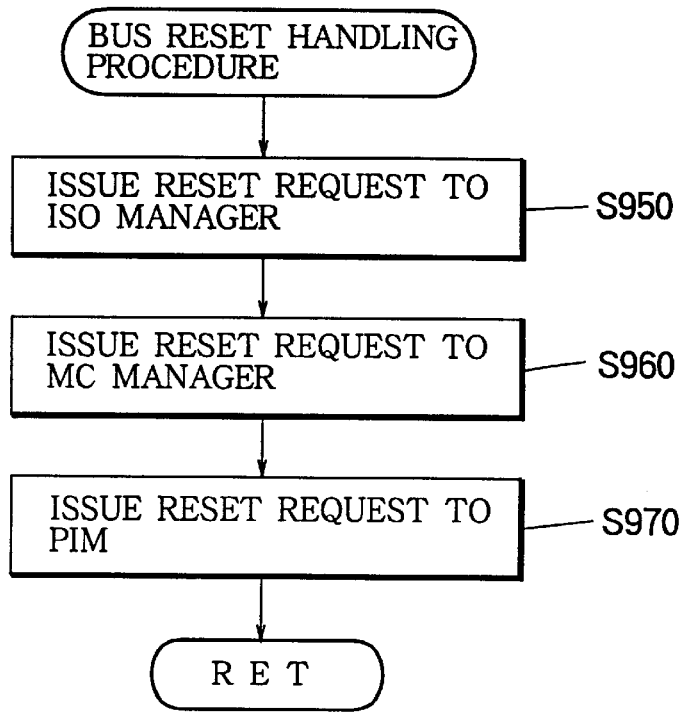
FIG. 32 is a flowchart illustrating bus reset handling procedure by the NIM.

If a bus reset occurs, the node controller 4 issues a bus reset request (SB Event Indication (BUS RESET START)) to the NIM 9. Upon receiving the request, the NIM 9 launches the bus reset handling procedure. The operation of the bus reset handling is shown in FIG. 32. Upon receiving the bus reset request, the NIM 9 issues a reset request (Isochronous Manager Control Request (Reset)) to the isochronous manager 7 in the mLAN transport layer 10. Then, in step S960, the NIM 9 also issues a reset request (Multicast Manager Control Request (Reset)) to the multicast manager 6. Finally in step S970, the NIM 9 issues a reset request (PIM Control Request (Reset)) to the PIM 8.

Figure 33:
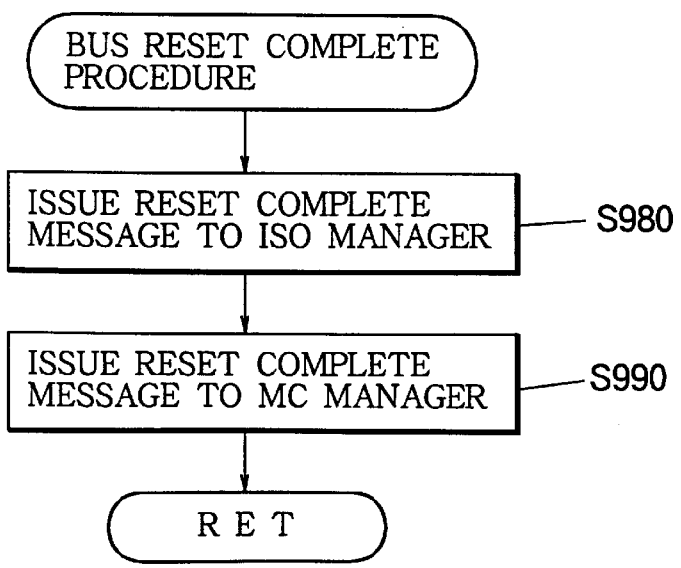
FIG. 33 is a flowchart illustrating bus reset complete handling procedure by the NIM.

When the bus reset is completed, the node controller 4 issues a Bus Reset Complete notification (SB Event Indication (BUS RESET COMPLETE)) to the NIM 9. Upon reception of the notification, the NIM launches a bus reset complete procedure shown in FIG. 33. In the bus reset complete procedure, the NIM 9 issues a reset complete message to the isochronous manager 7 in the mLAN transport layer 10 in step S980. Further, in step S990, the NIM 9 issues a reset complete message to the multicast manager 6.

2.7 mLAN transport layer facility 2.7.1 Path information table

The path information table stores the path information provided for the listener ports (isochronous or multicast listener) in the node. The path information table is maintained by the PIM 8. The contents of the path information table are accessed also by the NIM 9, which can pass the path information stored in the table to remote nodes. The format of the path information table is illustrated in FIG. 4. In the table, one path information entry is composed of items relevant to one path. The path information entry includes items listed below.

A. Port ID of the listener (16 bit): A port number in the local node.

B. Port ID of the talker (16 bit): A port number in the remote node.

C. Node unique ID (64 bit) of the node where the talker resides: An ID to identify the remote node. It has 64 bit length and the value is defined in advance by a maker of a node device. The node unique ID is never changed even by bus reset or power-on reset.

D. Connection flag: A flag indicating the connection status of the relevant path. Some path information table entry may not be reconfigured after re-initialization due to a change in the network architecture such as absence of a corresponding node. The flag indicates whether the path relevant to the entry is actually established or not.

2.7.2 Node information table

The node information table stores information on the correspondence between the node IDs and the node unique ID in the local bus. The node information table is maintained by the NIM 9. The NIM 9 updates the node information table after a bus reset, since, in the mLAN, the node ID may be changed by the bus reset. The node information table contains items listed below, which are formatted as illustrated in FIG. 5.

A. Node ID: An ID dynamically allocated to each node upon the bus initialization.

B. Node unique ID: A 64 bit ID allocated in advance for each node device. In the mLAN, upper 24 bits are allocated for a Node Vendor ID, and lower 40 bits are allocated for a Vendor Unique ID. Thus, the uniqueness of the node unique ID is assured.

2.7.3 Multicast information table

The multicast information table is maintained by the multicast manager 6. The table stores information on the correspondence between the port IDs of the multicast ports in the node and the multicast resources bound to the ports.

An entry for each multicast port contains items listed below, which are formatted as illustrated in FIG. 6.

A. Port ID: A port ID of the port to which a multicast resource is bound.

B. Port type: Type information indicating that the port is a multicast talker or listener.

C. Multicast resource: A multicast channel number.

Upon bus reset, the multicast resource (channel number) is cleared. The port ID of the multicast port is retained before and after the bus reset, and a new multicast channel number is allocated for each port after the bus reset complete. However, the contents of the multicast information table are not retained with respect to the power-reset (turning ON/OFF of the power supply).

2.7.4 Isochronous information table

The isochronous information table is maintained by the isochronous manager 7. The table stores information on the correspondence between the port ID of the isochronous port in the node and the isochronous resource bound to that port. An entry for each isochronous port contains items listed below, which are formatted as illustrated in FIG. 7.

A. Port ID: A port ID of the port to which isochronous resources are bound.

B. Port type: Type information indicating that the port is an isochronous talker or listener.

C. Isochronous resource: Resources bound to the port. An isochronous talker is bound with an isochronous channel number and a bandwidth, while an isochronous listener is bound with an isochronous channel number alone.

The content of the isochronous information table is retained before and after the bus reset.

2.7.5 Port information entry

The Port information entry is maintained by the NIM 9, and describes properties of each port created in the node. The port information entry is located in the address space of the node. The port information entry for each port is allocated at an address offset, which can be uniquely identified by the corresponding port ID. A remote node cannot directly access the address of the port information entry. Each port information entry contains items listed below relevant to the resource corresponding to the port type. The format of the entries are illustrated in FIG. 8.

A. Port ID: A 16 bit ID allocated for each port to identify the port. The uniqueness of the port ID is assured within a node. A port ID of special purpose ports (e.g. PIM 8/NIM 9 etc.) are fixedly allocated, and all the same throughout the nodes.

B. Port type: A type item indicating the transmission mode. 4 bits (d d d d) of the port type indicate the transmission mode (multicast/isochronous/transaction), and other 4 bits (k k k k) indicate the direction of the data transfer (send/receive/bidirectional).

C. Resource: Resources bound to the port. The resources may vary depending on the type of the port.

2.7.6 Talker information reporting packet

The talker information reporting packet is broadcasted to all the nodes within the local bits in order to notify that a new port is created and is bound with certain resources. The packet is broadcasted to the NIM 9 of all the nodes. In case of the multicast talker, the talker information reporting packet is broadcasted at the time of the port creation. The transport layer 10 in each node allocates a multicast channel number for multicast talkers in the order of the arrival of the talker information reporting packets. In case of the isochronous talker, the packet is issued when the isochronous manager in each node has obtained the isochronous resources. The talker information reporting packet includes items listed below, and its format is illustrated in FIG. 9.

A. Packet ID: An ID to indicate that the packet is the talker information reporting packet.

B. Talker port ID: A port ID of the created talker port.

C. Talker node ID: A node ID of the node to which the relevant talker port belongs.

D. Talker unique ID: The 64 bit ID allocated for each node as described above.

E. Talker resource information: Information about resources bound to the created talker port.

2.8 mLAN cycle structure

Figure 34:
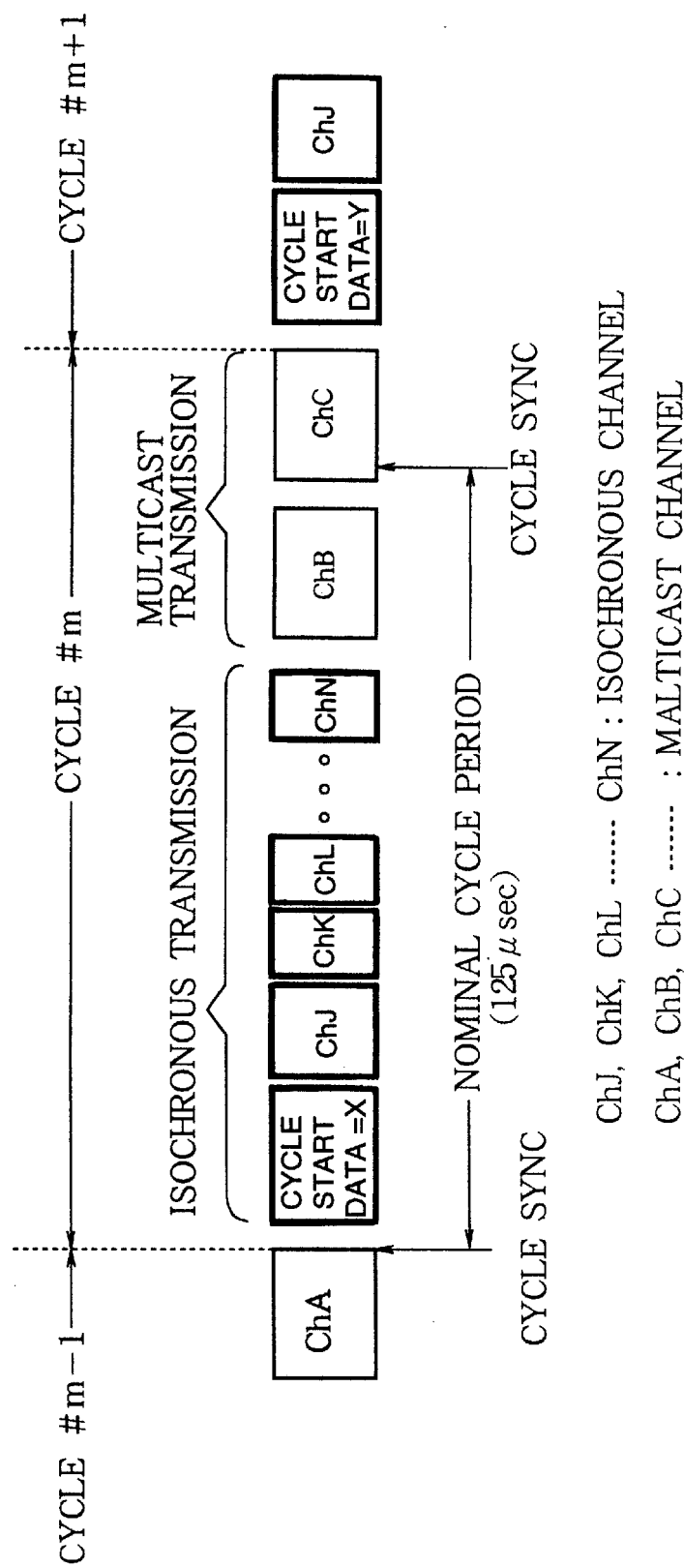
FIG. 34 is an example of a data transfer cycle structure in the mLAN according to the present invention.
Figure 35:
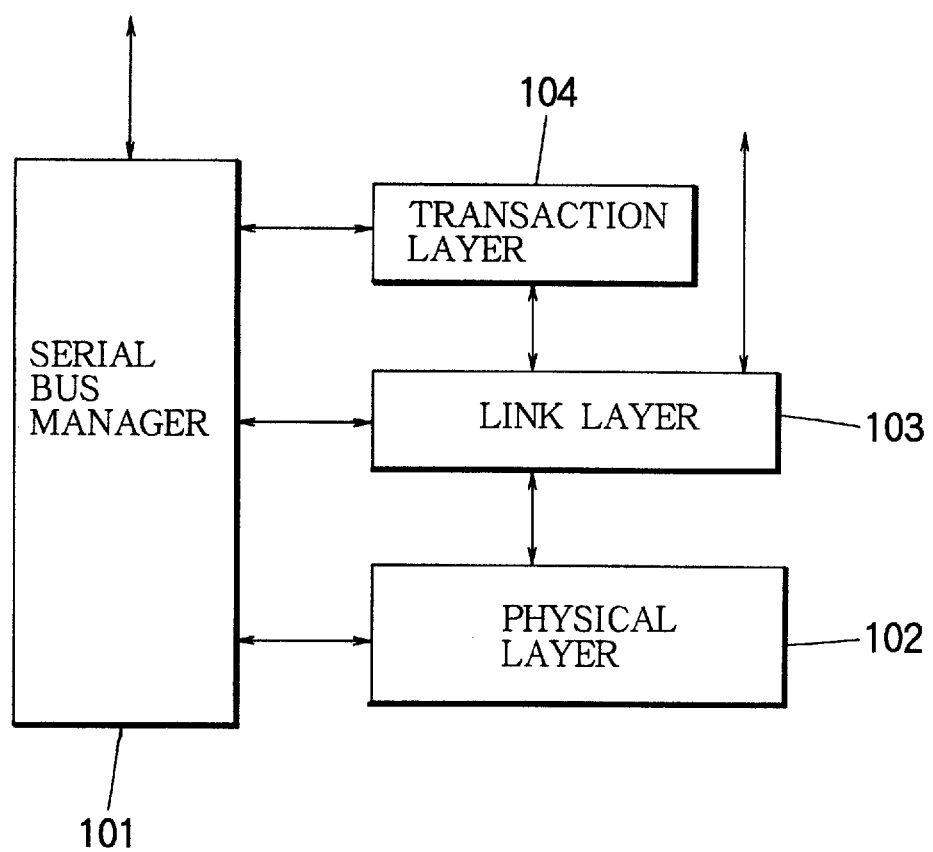
FIG. 35 is a schematic block diagram illustrating a protocol layer structure in a conventional network system.

An example of the above described mLAN cycle structure is illustrated in FIG. 34. In FIG. 34, cycle #m is mainly illustrated. Each transfer cycle has a nominal cycle period of 125 $\mu$sec. The start timing (cycle sync) is sent from a cycle master to all the node. The isochronous manager 7 receives the cycle sync, and executes the isochronous transmission if there is data to be transferred. In the isochronous transmission, only one node can transmit the data under the arbitration control of the physical layer 1. Thus, for example, the data corresponding to the respective bands are successively transferred through isochronous channels J, K, . . . , N as illustrated. The isochronous data is transferred per unit of the transmission cycle, since the bandwidth is respectively allocated to each channel. When the isochronous transmission is finished, the multicast transmission is executed under the control of the multicast manager 6. In this example, channels A, B and C are used as the multicast channels. In the multicast transmission, a packet transmission may not finish within a transfer cycle, since a preferred bandwidth can be obtained within a certain limited range. In such a case, the multicast transmission is continued beyond the length of one transfer cycle. The beginning of the next cycle (#m+1) is delayed as illustrated. The multicast transmission may be executed on demand only when there is data to be sent, so that this method is suitable for situations where data to be sent is discretely or intermittently generated.

2.9 Using multicast transmission and isochronous transmission

From the application side, it seems that both of the multicast and isochronous transmissions work in the same manner. The data is transferred as if there is no difference between the multicast and isochronous modes. Accordingly, a certain MIDI data can be sent out by either of the two transmission methods depending on the bandwidth required for the data and availability of the isochronous channels. In such a case, the talker port type may vary depending on the executed status of the application, while the listener port type is copied from the type of the talker port under the control of the path configuration by the PIM 8. Thus, the user of the application, particularly the listener user, can configure the logical paths without considering which transmission method is to be used. In the talker application side, the transmission method can be selected by the user or determined by the application automatically depending on the availability of the isochronous bands.

2.10 Plug and play

Plug and play is a technique by which an electronic device is used just by plugging the device without complicated configuration. In the mLAN, all the data are transferred in the multicast or isochronous transmission method, so that the devices (nodes) cannot operate to exchange data without the path configuration. To achieve plug and play operation in mLAN, "Well-known" channel is defined in the present invention, and a certain protocol is exchanged through a fixed channel in the initial state so that data can be transferred at least per the protocol basis. The Well-known channel assures the data exchange in situations where no specific path is established. Further, even if the path is established, the data transfer may be impossible without the Well-known channel in case that a new device (node) is introduced into the network.

With respect to receiving of data, a talker information reporting packet is broadcasted upon the bus reset caused by the new node introduction, so that the data can be received by detecting the channel number bound to the talker port, and by creating a listener port of the protocol type corresponding to the talker port. In such a case, the host application can utilize the information derived from a multiple of listener ports. In case of sending data, nothing is done because transmission is impossible without affecting the status of the listeners.

For efficiency, the MIDI message can be sent in a packet as it is. Any data, which does not require real time handling, can be transmitted with other protocols such as a normal file transfer protocol (FTP). The data such as digital audio data can preferably be transmitted as a stream by the isochronous transmission method.

Figure 36:
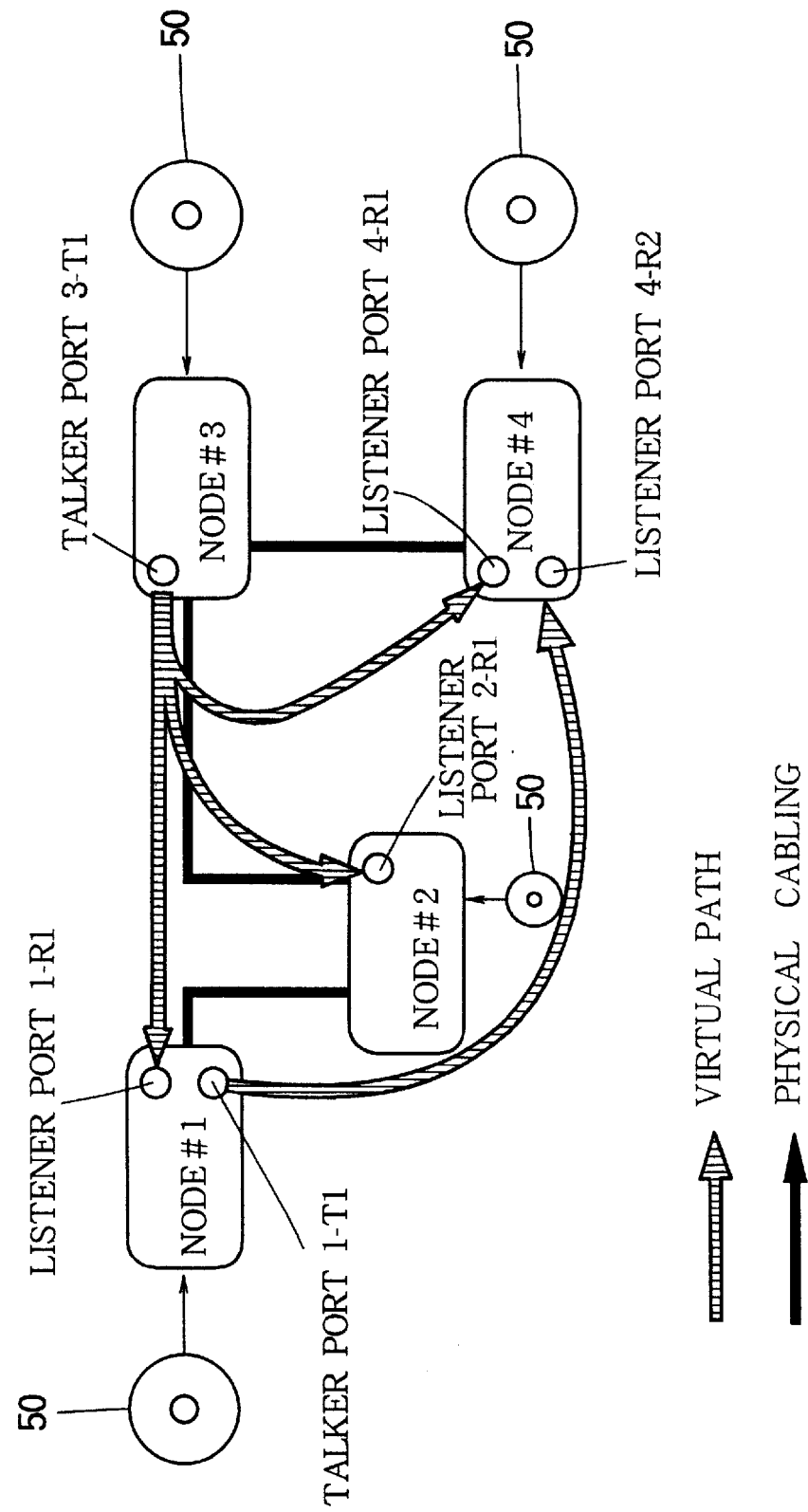
FIG. 36 is a schematic block diagram showing another embodiment of the inventive mLAN.

FIG. 36 shows another embodiment of the inventive mLAN. This embodiment basically has the same construction as that of the previous embodiment shown in FIG. 1. Therefore, corresponding blocks are denoted by the same reference numerals as those of the previous embodiment to facilitate understanding of this embodiment. The present mLAN is implemented by a computer system in which all of the nodes #1–#4 are implemented in the form of a personal computer, and are controlled by each CPU. The mLAN system is operated according to application programs loaded into each of the nodes #1–#4 by means of a machine-readable media 50 such as an optical memory disc and a magnetic memory disc.

Namely, as shown in FIG. 36, in the MILAN according to the invention, the plurality of the nodes #1–#4 are communicable with one another to exchange information and to transfer data, and the bus is provided for connection to the nodes #1–#4 and for configuration of the logical or virtual paths to logically link one node to another node so as to secure transfer of the data. Each node has at least one port which is allocated for accessing the bus and which is classified into the four types of the isochronous talker, the isochronous listener, the multicast talker and the multicast listener. For example, the node #1 binds an isochronous channel number and a communication band to the isochronous talker 1-T1 when the same is allocated for isochronously transmitting the data labeled by the bound isochronous channel number to the bus through the bound communication band. The node #4 binds an isochronous channel number to the isochronous listener 4-R2 when the same is allocated so that the isochronous listener 4-R2 can exclusively receive data transmitted from another isochronous talker 1-T1 allocated to another node #1 if the transmitted data is labeled by the same isochronous channel number as that bound to the isochronous listener 4-R2. The node #3 binds a multicast channel number to the multicast talker 3-T1 when the same is allocated for asynchronously broadcasting data labeled by the bound multicast channel number to the bus. The node #2 binds a multicast channel number to the multicast listener 2-R1 when the same is allocated so that the multicast listener 2-R1 can exclusively receive data transmitted from another multicast talker 3-T1 allocated to another node #3 if the transmitted data is labeled by the same multicast channel number as that bound to the multicast listener 2-R1.

In a specific form, a transmitter node having either of the isochronous talker and the multicast talker operates when the logical paths are reset for broadcasting talker information representative of resources including an isochronous channel number, a communication band and a multicast channel number, which may be newly bound, respectively, to the isochronous talker and the multicast talker upon resetting of the logical paths, while a receiver node having either of the isochronous listener and the multicast listener operates when the broadcasted talker information is received for newly binding resources including an isochronous channel number and a multicast channel number to the isochronous listener and the multicast listener to thereby restore the logical paths. In such a case, the receiver node saves path information representative of the logical paths and newly binds the resources according to the broadcasted talker information and the saved path information to ensure correspondence between the resources of the receiver node and the resources of the transmitter node in terms of the isochronous channel number and the multicast channel number. Each node has a specific communication architecture composed of protocol layers including a transport layer which contains an isochronous manager for acquiring isochronous resources and binding the acquired isochronous resources to either of the allocated isochronous talker and the isochronous listener, a multicast manager for acquiring multicast resources and binding the acquired multicast resources to either of the allocated multicast talker and the multicast listener, and a path information manager cooperating with the isochronous manager and the multicast manager for providing an upper protocol layer with a service to set the logical paths and to manage the set logical paths. Normally, the transmitter node is allocated with both of the isochronous talker and the multicast talker such that the transmitter node repeatedly carries out a transfer cycle containing isochronous transmission of data by the isochronous talker and asynchronous broadcasting of data by the multicast talker, and such that the transmitter node distributes the data each transfer cycle to either of the isochronous talker and the multicast talker according to property of the data and availability of the isochronous talker and the multicast talker. In such a case, the transmitter node treats mixture of continuous music data and discrete music data, and distributes the continuous music data to the isochronous talker while distributing the discrete music data to the multicast talker.

As described in the foregoing, according to the present invention, virtual and logical paths can be configured within the network independently on the physical connection topology. If two devices are connected to the network, a path can be established between the two devices independently on the physical location thereof, and data can be exchanged through the path. Thus, the data can be exchanged via the virtual paths independently on the network topology, so that the connecting order of the multiple devices is never mistaken or irrelevant, and the data can be transferred reliably. The data link can be modified easily without changing the physical connection of the devices, since the path is configured logically among the devices. The virtual path information is stored in each device connected to the whole network. Therefore, all the path information of the whole network system can be saved in a memory media, and the same network configuration can be restored easily and instantly with loading the saved path information from the media. The present invention makes it possible to use not only the isochronous transmission method in which the bandwidth of the transmission is assured, but also the multicast transmission method with which data can be transmitted on demand to specified multiple nodes. Thus, the data can be transferred efficiently no matter how discrete data is generated. Further, music data such as MIDI data and audio data, which require real time transmission, can be transmitted efficiently.

What is claimed is:

1. A network system comprising:

a plurality of nodes communicable with one another to exchange information and to transfer data; and a bus provided for connection to the nodes and for configuration of logical paths to logically link one node to another node so as to secure transfer of the data, wherein each node has at least one port which is allocated for accessing the bus and which is classified into four types of an isochronous talker, an isochronous listener, a multicast talker and a multicast listener, each node binding an isochronous channel number and a communication band to the isochronous talker when the same is allocated for isochronously transmitting the data labeled by the bound isochronous channel number to the bus through the bound communication band, each node binding an isochronous channel number to the isochronous listener when the same is allocated so that the isochronous listener can exclusively receive data transmitted from another isochronous talker allocated to another node if the transmitted data is labeled by the same isochronous channel number as that bound to the isochronous listener, each node binding a multicast channel number to the multicast talker when the same is allocated for asynchronously broadcasting data labeled by the bound multicast channel number to the bus, and otherwise each node binding a multicast channel number to the multicast listener when the same is allocated so that the multicast listener can exclusively receive data transmitted from another multicast talker allocated to another node if the transmitted data is labeled by the same multicast channel number as that bound to the multicast listener.

2. A network system according to claim 1, wherein a transmitter node having either of the isochronous talker and the multicast talker operates when the logical paths are reset for broadcasting talker information representative of resources including an isochronous channel number, a communication band and a multicast channel number, which may be newly bound, respectively, to the isochronous talker and the multicast talker upon resetting of the logical paths, while a receiver node having either of the isochronous listener and the multicast listener operates when the broadcasted talker information is received for newly binding resources including an isochronous channel number and a multicast channel number to the isochronous listener and the multicast listener to thereby restore the logical paths.

3. A network system according to claim 2, wherein the receiver node saves path information representative of the logical paths and newly binds the resources according to the broadcasted talker information and the saved path information to ensure correspondence between the resources of the receiver node and the resources of the transmitter node in terms of the isochronous channel number and the multicast channel number.

4. A network system according to claim 1, wherein each node has a communication architecture composed of protocol layers including a transport layer which contains an isochronous manager for acquiring isochronous resources and binding the acquired isochronous resources to either of the allocated isochronous talker and the isochronous listener, a multicast manager for acquiring multicast resources and binding the acquired multicast resources to either of the allocated multicast talker and the multicast listener, and a path information manager cooperating with the isochronous manager and the multicast manager for providing an upper protocol layer with a service to set the logical paths and to manage the set logical paths.

5. A network system according to claim 1, including a transmitter node allocated with both of the isochronous talker and the multicast talker such that the transmitter node repeatedly carries out a transfer cycle containing isochronous transmission of data by the isochronous talker and asynchronous broadcasting of data by the multicast talker, and such that the transmitter node distributes the data each transfer cycle to either of the isochronous talker and the multicast talker according to property of the data and availability of the isochronous talker and the multicast talker.

6. A network system according to claim 5, wherein the transmitter node treats mixture of continuous music data and discrete music data, and distributes the continuous music data to the isochronous talker while distributes the discrete music data to the multicast talker.

7. A data transfer method in a network system comprised of a plurality of nodes communicable with one another to exchange information and to transfer data, and a bus provided for connection to the nodes and for configuration of logical paths to logically link one node to another node so as to secure transfer of the data, the method comprising the steps of:

allocating to each node at least one port which is used for accessing the bus and which is classified into four types of an isochronous talker, an isochronous listener, a multicast talker and a multicast listener, binding an isochronous channel number and a communication band to the isochronous talker when the same is allocated to the node for isochronously transmitting the data labeled by the bound isochronous channel number to the bus through the bound communication band, binding an isochronous channel number to the isochronous listener when the same is allocated to the node so that the isochronous listener can exclusively receive data transmitted from another isochronous talker allocated to another node if the transmitted data is labeled by the same isochronous channel number as that bound to the isochronous listener, binding a multicast channel number to the multicast talker when the same is allocated to the node for asynchronously broadcasting data labeled by the bound multicast channel number to the bus, and otherwise binding a multicast channel number to the multicast listener when the same is allocated to the node so that the multicast listener can exclusively receive data transmitted from another multicast talker allocated to another node if the transmitted data is labeled by the same multicast channel number as that bound to the multicast listener.

8. A data transfer method according to claim 7, further comprising the steps of operating a transmitter node having either of the isochronous talker and the multicast talker when the logical paths are reset for broadcasting talker information representative of resources including an isochronous channel number, a communication band and a multicast channel number, which may be newly bound, respectively, to the isochronous talker and the multicast talker upon resetting of the logical paths, and operating a receiver node having either of the isochronous listener and the multicast listener when the broadcasted talker information is received for newly binding resources including an isochronous channel number and a multicast channel number to the isochronous listener and the multicast listener to thereby restore the logical paths.

9. A data transfer method according to claim 8, further comprising the step of operating the receiver node to save path information representative of the logical paths and to newly bind the resources according to the broadcasted talker information and the saved path information to ensure correspondence between the resources of the receiver node and the resources of the transmitter node in terms of the isochronous channel number and the multicast channel number.

10. A data transfer method according to claim 7, further comprising the step of operating a transmitter node allocated with both of the isochronous talker and the multicast talker such that the transmitter node repeatedly carries out a transfer cycle containing isochronous transmission of data by the isochronous talker and asynchronous broadcasting of data by the multicast talker, and such that the transmitter node distributes the data each transfer cycle to either of the isochronous talker and the multicast talker according to property of the data and availability of the isochronous talker and the multicast talker.

11. A data transfer method according to claim 10, further comprising the step of operating the transmitter node to treat mixture of continuous music data and discrete music data, and to distribute the continuous music data to the isochronous talker while distributes the discrete music data to the multicast talker.

12. In a network system comprised of a plurality of nodes communicable with one another to exchange information and to transfer data, and a bus provided for connection to the nodes and for configuration of logical paths to logically link one node to another node so as to secure transfer of the data, a machine-readable media containing instructions for enabling the network system to perform a method comprising the steps of:

allocating to each node at least one port which is used for accessing the bus and which is classified into four types of an isochronous talker, an isochronous listener, a multicast talker and a multicast listener, binding an isochronous channel number and a communication band to the isochronous talker when the same is allocated to the node for isochronously transmitting the data labeled by the bound isochronous channel number to the bus through the bound communication band, binding an isochronous channel number to the isochronous listener when the same is allocated to the node so that the isochronous listener can exclusively receive data transmitted from another isochronous talker allocated to another node if the transmitted data is labeled by the same isochronous channel number as that bound to the isochronous listener, binding a multicast channel number to the multicast talker when the same is allocated to the node for asynchronously broadcasting data labeled by the bound multicast channel number to the bus, and otherwise binding a multicast channel number to the multicast listener when the same is allocated to the node so that the multicast listener can exclusively receive data transmitted from another multicast talker allocated to another node if the transmitted data is labeled by the same multicast channel number as that bound to the multicast listener.

13. A machine-readable media according to claim 12, wherein the method further comprises the steps of operating a transmitter node having either of the isochronous talker and the multicast talker when the logical paths are reset for broadcasting talker information representative of resources including an isochronous channel number, a communication band and a multicast channel number, which may be newly bound, respectively, to the isochronous talker and the multicast talker upon resetting of the logical paths, and operating a receiver node having either of the isochronous listener and the multicast listener when the broadcasted talker information is received for newly binding resources including an isochronous channel number and a multicast channel number to the isochronous listener and the multicast listener to thereby restore the logical paths.

14. A machine-readable media according to claim 13, wherein the method further comprises the step of operating the receiver node to save path information representative of the logical paths and to newly bind the resources according to the broadcasted talker information and the saved path information to ensure correspondence between the resources of the receiver node and the resources of the transmitter node in terms of the isochronous channel number and the multicast channel number.

15. A machine-readable media according to claim 12, wherein the method further comprises the step of operating a transmitter node allocated with both of the isochronous talker and the multicast talker such that the transmitter node repeatedly carries out a transfer cycle containing isochronous transmission of data by the isochronous talker and asynchronous broadcasting of data by the multicast talker, and such that the transmitter node distributes the data each transfer cycle to either of the isochronous talker and the multicast talker according to property of the data and availability of the isochronous talker and the multicast talker.

16. A machine-readable media according to claim 15, wherein the method further comprises the step of operating the transmitter node to treat mixture of continuous music data and discrete music data, and to distribute the continuous music data to the isochronous talker while distributes the discrete music data to the multicast talker.

* * * * *